United States Patent
Kiyomiya et al.

(10) Patent No.: US 6,621,244 B1
(45) Date of Patent: Sep. 16, 2003

(54) CONTROL APPARATUS FOR HYBRID VEHICLE

(75) Inventors: Takashi Kiyomiya, Utsunomiya (JP); Atsushi Izumiura, Utsunomiya (JP); Shinichi Kitajima, Utsunomiya (JP); Shigetaka Kuroda, Utsunomiya (JP); Kazutomo Sawamura, Saitama (JP); Atsushi Matsubara, Utsunomiya (JP); Hideyuki Oki, Utsunomiya (JP); Kan Nakaune, Kawachi-gun (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/048,448
(22) PCT Filed: Aug. 4, 2000
(86) PCT No.: PCT/JP00/05246
§ 371 (c)(1), (2), (4) Date: Feb. 4, 2002
(87) PCT Pub. No.: WO01/10666
PCT Pub. Date: Feb. 15, 2001

(30) Foreign Application Priority Data

Aug. 5, 1999 (JP) .......................... 11-223133
Aug. 5, 1999 (JP) .......................... 11-223134

(51) Int. Cl.$^7$ ............................................. G05B 5/01
(52) U.S. Cl. ........................ 318/611; 318/139; 180/65.2
(58) Field of Search .............................. 318/611, 139; 180/65.2, 65.3

(56) References Cited

U.S. PATENT DOCUMENTS

| | | | | |
|---|---|---|---|---|
| 6,102,144 A | * | 8/2000 | Lutz | 180/65.2 |
| 6,176,808 B1 | * | 1/2001 | Brown et al. | 477/5 |
| 6,260,465 B1 | * | 7/2001 | Zonak et al. | 89/40.03 |

FOREIGN PATENT DOCUMENTS

| | | |
|---|---|---|
| EP | 0 440 185 A2 | 8/1991 |
| JP | 59-122754 | 7/1984 |
| JP | 61-70149 | 4/1986 |
| JP | 61-135936 | 6/1986 |
| JP | 3-230798 | 10/1991 |
| JP | 4-300437 | 10/1992 |
| JP | 5-302525 | 11/1993 |
| KR | 0147080 | 5/1998 |

* cited by examiner

Primary Examiner—Karen Masih
(74) Attorney, Agent, or Firm—Armstrong, Westerman & Hattori, LLP.

(57) ABSTRACT

Conditions for permitting operation of vibration control are that; a stored charge of a battery 17 for an electric motor detected by storage state monitoring devices 15 and 24 is larger than a predetermined storage charge threshold, a vehicle's engine is idling, engine speed is within a prescribed range, and engine load is within a prescribed range. When all these conditions are satisfied, vibration damping control by a vibration damping control device is performed.

11 Claims, 10 Drawing Sheets

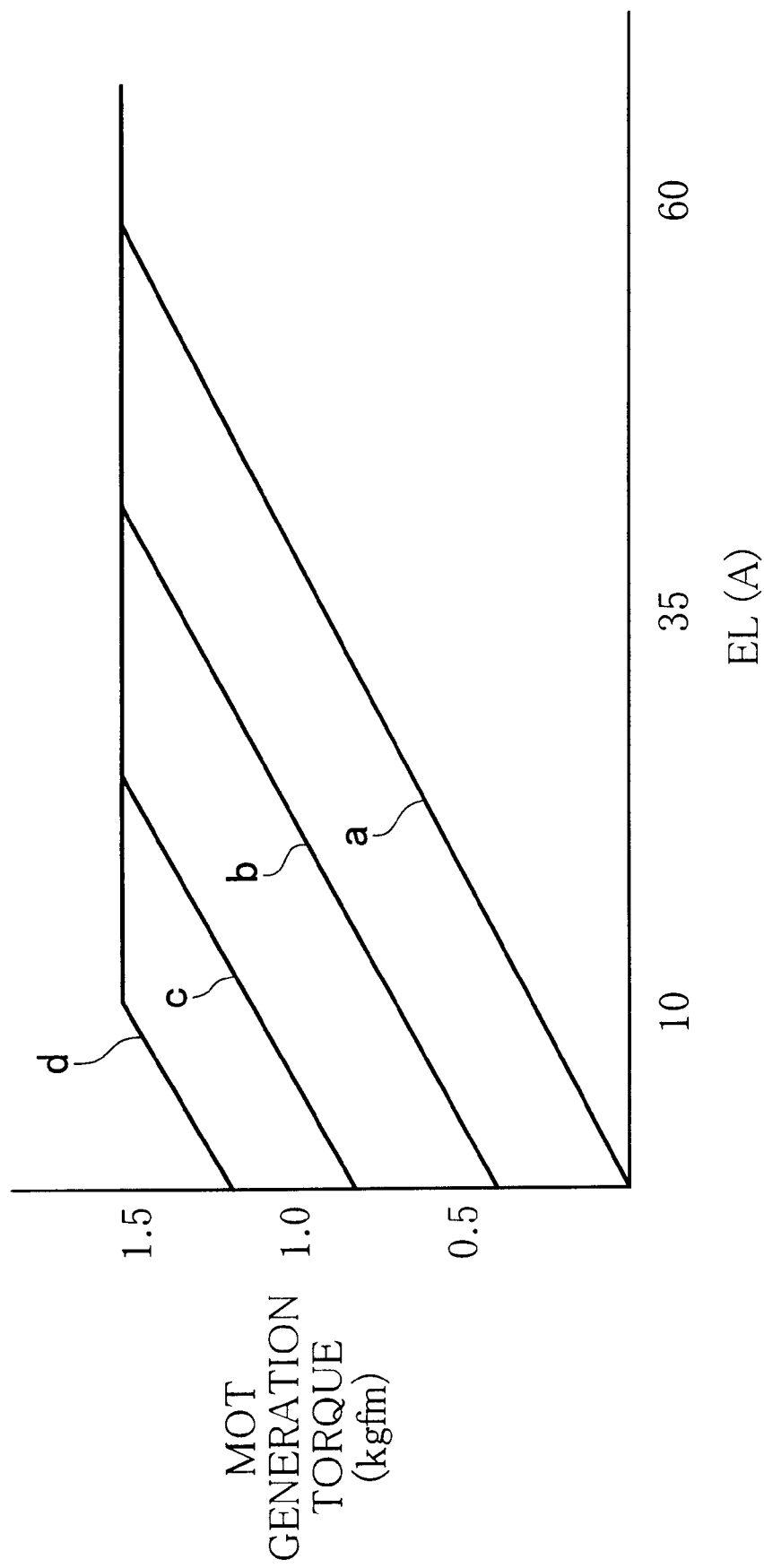

CONTROL APPARATUS FOR HYBRID VEHICLE

TECHNICAL FIELD

The present invention relates to a control apparatus for a hybrid vehicle in which a propulsion force for running the vehicle is generated by output from an engine assisted by an electric motor as required.

BACKGROUND ART

Heretofore, there is known a hybrid vehicle incorporating an electric motor in addition to an engine as a drive source for vehicle propulsion.

One type of such hybrid vehicle is a parallel hybrid vehicle wherein an electric motor rotated by electricity is used as an auxiliary drive source for assisting the output from an engine, being an internal combustion engine. In this parallel hybrid vehicle, various control is carried out, such as assisting the output from the engine by means of the electric motor at the time of acceleration for example, and charging a battery by deceleration regeneration at the time of deceleration, so that the stored charge of the battery can be maintained while satisfying the requirements of the driver. (For example, as disclosed in Japanese Unexamined Patent Application, First Publication No. Hei 7-123509.)

An engine, being an internal combustion engine, sometimes generates unpleasant vibrations at the time of low speed, that is, when idling. In a hybrid vehicle as described above, an electric motor that can reliably control torque electrically is incorporated into the engine, so that the engine vibration can be suppressed by controlling the torque of this electric motor. The present inventor has filed a first application for an engine vibration damping apparatus using such an electric motor (Japanese Unexamined Patent Application, First Publication No. Hei 9-248374).

Such an engine vibration control apparatus generates a plurality of different sine waves in proportion to the rotational frequency of the engine output shaft depending on the running conditions of the engine, generates a composite wave of these sine waves as a torque waveform for the electric motor to generate to reduce the torque variation of the engine output shaft, and controls the vibration by controlling the electric motor according to this composite wave torque waveform. In order to operate such an engine vibration damping apparatus, some energy may be consumed.

Accordingly, if such vibration damping control is performed at the time of idling for example, depending on the state of power being consumed elsewhere in a vehicle, such as lighting, wiper operation, or furthermore the operation of a car stereo or the like, the electric power supply generated by the engine may be insufficient, and the deficiency is drawn from the electric motor battery, resulting in the stored charge of the electric motor battery being reduced. In this manner, if the stored charge of the electric motor battery is reduced, assistance cannot be given to the engine even if the conditions require it.

DISCLOSURE OF THE INVENTION

The present invention takes into consideration the above situation, with an object of providing a control apparatus for a hybrid vehicle that prevents a situation in which a stored charge of an electric motor battery is reduced below a minimum required due to the vibration damping control device being operated, in other words, priority is given to preventing the stored charge of the electric motor battery being reduced below the minimum required, so that the occurrence of a situation that requires assistance to the engine by the electric motor can be handled without fail.

Furthermore, the present invention has an object of providing a control apparatus for a hybrid vehicle that can prevent the stored charge of the electric motor battery from being reduced below the minimum required at the time of idling, and additionally can increase the stored charge.

To achieve the abovementioned objects, a control apparatus for a hybrid vehicle (for example, an ECU in embodiments) of a first aspect of the invention comprises: an engine (for example, an engine 11 in the embodiment) which outputs a propulsion force for a vehicle; an electric motor (for example, a motor 12 in the embodiment) which assists the output from the engine; a battery (for example, an electric motor battery 17 in the embodiment) for an electric motor that drives the electric motor and also stores electric power generated by the electric motor; and a storage state monitoring device (for example, a current sensor 24 and an ECU 15 in the embodiment) which monitors the stored charge of the electric motor battery, and is characterized in that one condition for permitting operation of vibration damping control by the electric motor, for suppressing vibration caused by torque variation of the engine, is that a stored charge of the electric motor battery detected by the battery storage state monitoring device must be greater than a predetermined stored charge threshold, and when the condition is satisfied, vibration damping is performed by the vibration damping device, or alternatively when the condition is not satisfied, vibration damping by the vibration damping device is inhibited.

Here, vibration damping control for controlling engine vibration by the electric motor is performed through a vibration damping device (for example, a power drive unit 16 in the embodiment).

With such a construction, only in the case where the stored charge of the electric motor battery is greater than a predetermined stored charge threshold, that is, only in the case where there is some surplus stored charge in the electric motor battery, is vibration damping control performed by the vibration damping device. Accordingly, a situation does not occur in which there is no surplus stored charge of the electric motor battery, leading to the stored charge of the electric motor battery being reduced below the minimum required due to the operation of the vibration damping control device.

A second aspect of the invention is characterized in that conditions for permitting operation of vibration damping control require that, in addition to a stored charge of the electric motor battery detected by the storage state monitoring device being greater than a predetermined stored charge threshold (for example, a determination of step S9 in the embodiment), the vehicle is idling (for example, a determination of step S1 of the embodiment), engine speed is within a prescribed range (for example, a determination of step S5 in the embodiment), and engine load is within a prescribed range (for example, a determination of step S6 in the embodiment), and vibration damping control is performed when all conditions are satisfied.

With such a construction, it is possible to perform vibration damping control in a state where there is some surplus stored charge in the electric motor battery, the vehicle is idling, and the engine rotation is stable in regard to the engine speed and engine load, but excepting a case where a high load is required on the engine, that is, only when vibration damping control is genuinely required.

A third aspect of the invention is characterized in that conditions for permitting operation of the vibration damping device require that an electrical load of the vehicle excluding the electric motor is greater than a predetermined electrical load threshold (for example, a determination of step S10 in the embodiment), and when the electrical load exceeds the predetermined electrical load threshold, vibration damping control by the vibration damping device is performed for a predetermined limited time (for example, step S12 in the embodiment), and conversely, when the electrical load is less than or equal to the predetermined electrical load threshold, vibration damping control by the vibration damping device is performed without any set time limit (for example, step S11 in the embodiment).

With such a construction, in the case where the electrical load of the vehicle is high, the electric power produced by the engine is insufficient, and the deficiency is drawn from the electric motor battery, vibration damping control can be performed only for a predetermined limited time. Accordingly, it is possible to prevent a situation in which the amount of electric power drawn from the electric motor battery is increased and the stored charge of the electric motor battery reduced, due to performing vibration damping control over a long time.

A fourth aspect of the invention is characterized in that when the electrical load exceeds a predetermined electrical load threshold, and vibration damping control by the vibration damping device is performed for a predetermined limited time, engine speed is increased as an elapsed time of vibration damping control increases (for example, steps S13, S15 and S17 in the embodiment).

With such a construction, when the engine speed increases, the amount of generation by the engine increases, and the amount of electric power drawn from the electric motor battery decreases. Consequently, it is possible to minimize the decrease of the stored charge of the electric motor battery. Furthermore, when the engine speed increases, the vibration that occupants experience is reduced.

A fifth aspect of the invention is characterized in that when increasing engine speed, this is increased in stages as the elapsed time of vibration damping control increases (for example, steps S13, S15 and S17).

With such a construction, in the case where vibration damping control is discontinued after a predetermined time has passed, since the engine speed is increased in stages, and vibration damping control is discontinued in a state of lower sensation of vibration, occupants experience little unpleasant sensation caused by engine vibration.

Incidentally, if vibration damping control is discontinued when the engine speed is low, the difference in vibration felt physically between when vibration damping control is performed and when not performed is considerable, so that the unpleasant sensation experienced by occupants increases when vibration damping control is discontinued.

A sixth aspect of the invention is characterized in that when the engine is idling (for example, a determination of step SA1 in the embodiment), when the stored charge detected by the storage state monitoring device is greater (for example, a determination of step SA8 in the embodiment) than a predetermined stored charge threshold (for example, a first threshold value in the embodiment), vibration damping control for controlling the vibration damping of the engine is performed by the electric motor (for example, processing of step SA14 in the embodiment), and conversely, when the stored charge of the battery is less than or equal to the stored charge threshold value (for example, a determination of step SA8 in the embodiment), vibration damping control by the electric motor is inhibited (for example, processing of step SA10 in the embodiment), and when the stored charge of the battery detected by the storage state monitoring device is less than a predetermined second threshold that is lower than the stored charge threshold value (for example, determination of steps SB7 and SC7 in the embodiment), the idling speed of the engine is increased (for example, processing of steps SB10 and SC11 in the embodiment).

In this manner, when the stored charge of the battery detected by the storage state monitoring device is less than or equal to the predetermined stored charge threshold, vibration damping control by the electric motor is stopped, and thus first of all power consumption is suppressed. However, the stored charge of the battery still decreases, and when the stored charge of the battery detected by the storage state monitoring device is less than the predetermined second threshold that is lower than the stored charge threshold, the idling speed of the engine is increased, and the drive torque of the engine is increased. As a result, it is possible to increase the torque that can be distributed as generation torque for the electric motor to generate electricity, enabling an increase in the amount of charge to the battery.

In a seventh aspect of the invention, when the stored charge of the battery detected by the storage state monitoring device is the same as the second threshold or less than a third threshold that is even lower (for example, determinations of steps SB7 and SC7 in the embodiment), if the arrangement is such that mechanical loads, other than the drive torque of the electric motor driven by the engine, are removed from the drive torque (for example, processing of steps SB9 and SC10 in the embodiment), it is possible to further increase the torque that can be distributed as generation torque for the electric motor to generate electricity.

In an eighth aspect of the invention, if a mechanical load is either drive torque of an air conditioner compressor (for example, a compressor 27 in the embodiment) or creeping torque (for example, steps SB9 and SC10 in the embodiment), since these torques are large it is possible to effectively increase the torque that can be distributed as generation torque for the electric motor to generate electricity.

BRIEF DESCRIPTION OF THE DRAWINGS

FIG. 10 is a characteristic diagram showing the control characteristics of the generation of torque by an electric motor according to the second embodiment of a control apparatus for a hybrid vehicle of the present invention.

EMBODIMENTS

First Embodiment

Hereinafter is a description of a first embodiment of a control apparatus for a hybrid vehicle of the present invention with reference to drawings.

Figure 1:
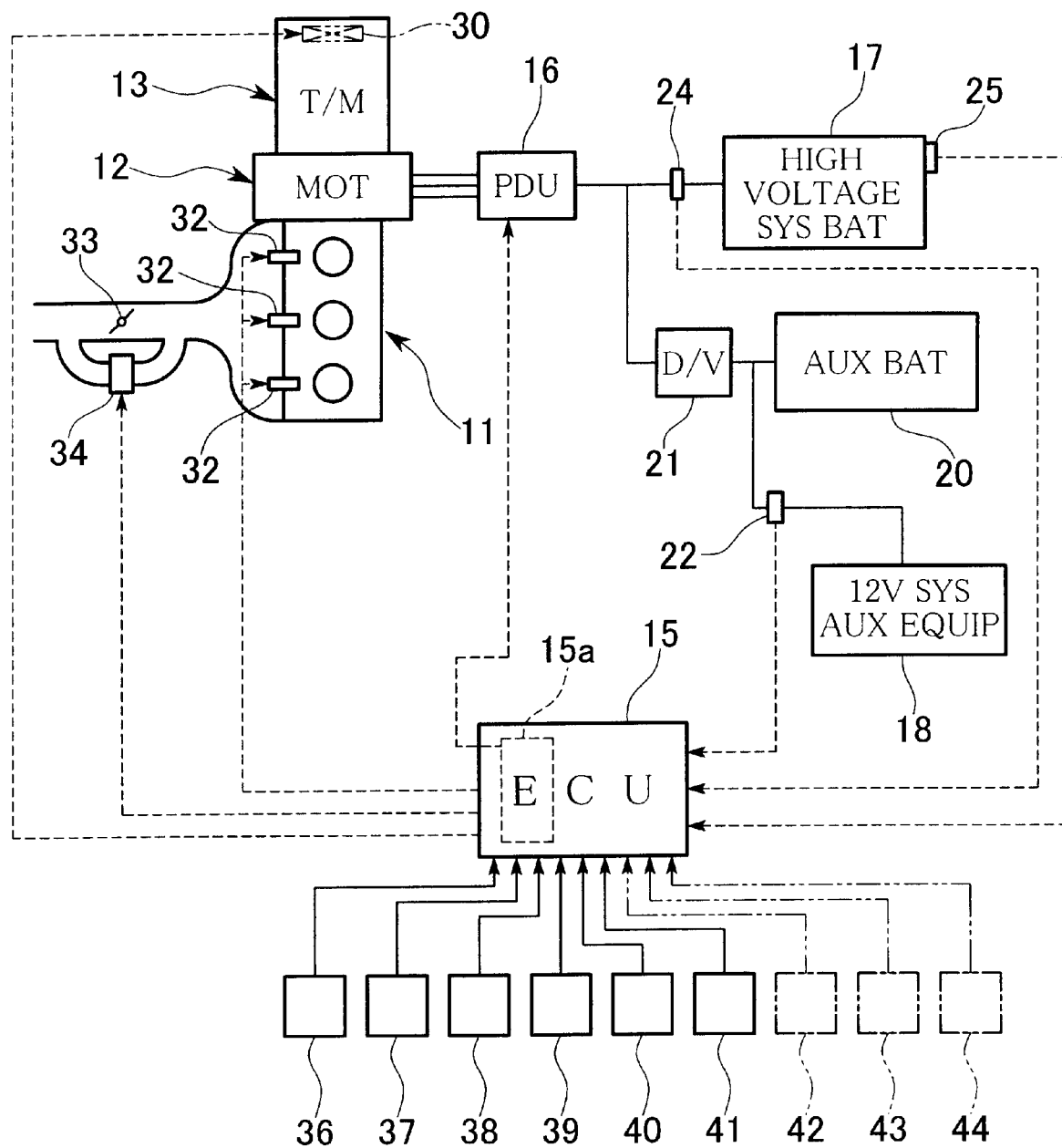
FIG. 1 is a schematic diagram showing the overall structure of a hybrid vehicle containing a first embodiment of a control apparatus for a hybrid vehicle of the present invention.

FIG. 1 is a schematic diagram of the overall structure of a parallel type hybrid vehicle.

As shown in FIG. 1, the hybrid vehicle has an engine 11, being an internal combustion engine which outputs the propulsion force of a vehicle, an electric motor 12 linked to the engine 11 which assists the output from the engine 11, and a transmission 13 including either an automatic transmission or a manual transmission, to which the outputs from both the engine 11 and the electric motor 12 are transmitted.

In this hybrid vehicle, the output from the transmission 13 is transmitted to driving wheels, which are not shown in the figure, and generates vehicle propulsion.

Furthermore in this hybrid vehicle, at the time of deceleration, driving force is transmitted from the driving wheels to the electric motor 12 via the transmission 13. At this time the electric motor 12 functions as a generator to produce so called regenerative braking, and the kinetic energy of the vehicle is recovered as electrical energy.

The drive and regenerative braking of the electric motor 12 are performed through a power drive unit 16, which receives control instructions from an ECU 15 serving as a control unit.

The power drive unit 16 receives instruction signals from the ECU 15, and also functions as a vibration damping device for controlling vibration caused by variations in torque from the engine 11. That is to say, the ECU 15 incorporates a control section 15a for vibration damping. This control section 15a, as described in the prior art, generates a plurality of different sine waves in proportion to the rotational frequency of the output shaft of the engine 11 depending on the running conditions of the engine 11, and generates a composite wave of these sine waves as a torque waveform for the electric motor 12 to generate electricity to reduce the variation in torque of the engine output shaft. The control section 15a generates control instruction signals, and performs drive and regenerative control of the electric motor 12 via the power drive unit 16 according to the composite wave torque waveform.

Furthermore, the power drive unit 16 is connected to a high voltage system electric motor battery 17, capable of storing electricity and transferring electrical energy to and from the electric motor 12. This battery 17 is constructed from individual modules wherein, for example a plurality of cells is connected in series, with a plurality of these modules connected in series. The battery 17 for the electric motor stores electric power generated by the electric motor 12 through regenerative braking and electric power generated by the electric motor 12 through the drive torque of the engine 11.

On the hybrid vehicle, a 12 volt auxiliary battery 20 is installed for driving a range of 12 volt system auxiliary equipment 18, such as lights, wipers, car stereo and the like. This auxiliary battery 20 is connected to the battery 17 via a downverter 21. The downverter 21 reduces the generated voltage of the electric motor 12 and the voltage of the battery 17, and charges the auxiliary battery 20. The downverter 21 and the auxiliary battery 20 are connected to a current sensor 22 for detecting current flowing from them into the 12 volt system auxiliary equipment 18, and the detection signal from this current sensor 22 is transmitted to the ECU 15.

Furthermore, the battery 17 is connected to a current sensor 24 for detecting current flowing from the power drive unit 16 and a voltage sensor 25 for detecting the voltage of the battery 17, and the detection signals from the sensors 24 and 25 are transmitted to the ECU 15. The ECU 15 calculates stored charge SOC of the battery 17 based on the detection signal from the current sensor 24. As a result, the current sensor 24 and the ECU 15 comprise a storage state monitoring device which monitors the stored charge of the battery 17.

In the case of an automatic transmission, the transmission 13 incorporates a clutch 30 for controlling the transmission of driving force from the engine 11 to the driving wheels under control instructions from the ECU 15. In the case where the D position of the transmission 13 is selected, even when idling the ECU 15 does not normally cut transmission of the driving force from the engine 11 to the driving wheels completely by this clutch 30, but induces so-called creeping torque.

Here, the ECU 15 is connected to injectors 32 for injecting fuel into the engine 11 and an air valve 34 that introduces air to the engine 11 and is capable of controlling the quantity independently of the opening and closing of a throttle valve 33. The ECU 15 adjusts the idling speed of the engine 11 by controlling the injectors 32 and the air valve 34.

Furthermore the ECU 15, to which detection signals are input, is connected to a vehicle speed sensor 36 for detecting vehicle speed V based on the speed of the driven wheels, an engine speed sensor 37 for detecting the speed Ne of the engine 11, a brake switch 38 for detecting operation or non-operation of the brake pedal, a throttle opening sensor 39 for detecting the opening TH of the throttle valve 33 of the engine 11, an air intake passage pressure sensor 40 for detecting the air intake passage pressure PB of the engine 11, and a water temperature sensor 41 for detecting the water temperature of the engine 11.

In addition, in the case where the transmission 13 is an automatic transmission, the ECU 15 is connected to a shift position sensor 42 for detecting the gear shift position. On the other hand, in the case where the transmission 13 is a manual transmission, it is connected to a clutch switch 43 for detecting operation or non-operation of the clutch pedal and a neutral switch 44 for detecting whether the gear of the transmission 13 is in neutral or not, and detection signals are input from the connected objects.

The control detail of the ECU 15 will be described mainly with reference to the flow charts in FIG. 2 and FIG. 3.

The control section 15*a* incorporated in the ECU 15 performs vibration damping control for suppressing vibration of the engine 11 by performing drive and regeneration control of the electric motor 12 via the power drive unit 16. At this time, vibration damping permission determination control of whether or not conditions are in a region where performing vibration damping control is permitted, that is, whether it satisfies the permission conditions or not, is performed as follows.

That is to say, in step S1 it is determined whether an idling condition, from which it can be determined that the engine 11 is idling, is satisfied or not, by whether two conditions are satisfied or not by detection signals from the engine speed sensor 37 and the throttle opening sensor 39, the two conditions being a rotational speed condition in that the engine speed Ne is less than a predetermined value, and a valve opening condition in that the throttle valve opening TH is 0.

In the case where it is determined in step S1 that at least one of the rotational speed condition and the valve opening condition is not satisfied, thus not satisfying the idling condition, a timer T1 is reset in step S2, and vibration damping control is inhibited in step S3. Hence power supply to the electric motor 12 from the power drive unit 16 is stopped, and the present control terminates.

Conversely, in the case where it is determined that the rotational speed condition and the valve opening condition are both satisfied in step S1, thus satisfying the idling condition, flow proceeds toward vibration damping permission in steps 4 and 4'.

In this manner, the reason why flow proceeds toward vibration damping permission only when the idling condition is satisfied is that an engine is generally in a low rotational speed region when in an idling state, and occupants experience unpleasant vibrations. Furthermore, the reason why flow proceeds toward vibration damping inhibiting when the idling condition is not satisfied is that engine speed is comparatively high when not in an idling state, so there is less unpleasant vibration for the occupants, and it is desirable for engine power to not be consumed for vibration damping control but be used for driving.

In the case where the transmission 13 is a manual transmission, in step S4 it is determined whether a power transmission system condition is satisfied or not by whether at least one of a clutch disengaged condition, being that the clutch is disengaged, or a neutral condition, being that the gear shift is in neutral, is satisfied or not, by detection signals from the clutch switch 43 and the neutral switch 44.

On the other hand, in the case where the transmission 13 is an automatic transmission, in step S4' it is determined whether a power transmission system condition is satisfied or not by whether at least one of a drive disengaged condition, being that the gear shift is in P position or N position, or a brake on condition, being that the brake is on, is satisfied or not, by detection signals from the shift position sensor 42 and the brake switch 38.

If the transmission 13 is a manual transmission, in the case where it is determined in step S4 that neither the clutch disengaged condition nor the neutral condition is satisfied, thus not satisfying the power transmission system condition, then in step S2 a timer T1 is reset, and in step S3 vibration damping control is inhibited. Hence power supply to the electric motor 12 from the power drive unit 16 is stopped, and the present control is terminated.

On the other hand, if the transmission 13 is an automatic transmission, in the case where it is determined in step S4' that neither the drive disengaged condition nor the brake on condition is satisfied, thus not satisfying the power transmission system condition, then in step S2 the timer T1 is reset, and in step S3 vibration damping control is inhibited. Hence power supply to the electric motor 12 from the power drive unit 16 is stopped, and the present control is terminated.

Conversely, if the transmission 13 is a manual transmission, in the case where it is determined in step S4 that at least one of the clutch disengaged condition and the neutral condition is satisfied, thus satisfying the power transmission system condition, flow proceeds toward vibration damping permission in step S5.

On the other hand, if the transmission 13 is an automatic transmission, in the case where it is determined in step S4' that at least one of the drive disengaged condition and the brake on condition is satisfied, thus satisfying the power transmission system condition, flow proceeds toward vibration damping permission in step S5.

In this manner, whether a manual transmission or an automatic transmission, the reason why flow proceeds toward vibration damping permission only when the driving force of the engine 11 is not transmitted to the driving wheels via the power transmission system is that, hypothetically, in the case where the driving force of the engine is transmitted to the driving wheels, it means that the vehicle is running, and as a result the vehicle is influenced at this time by the roughness of the road surface via the wheels, and vibration caused by the road surface condition occurs. Hence performing vibration damping control of the engine is meaningless.

In step S5 it is determined whether an engine speed condition, being that the engine speed Ne is within a prescribed range where vibration damping is required, is satisfied or not, by a detection signal from the engine speed sensor 37. In the case where it is determined that the engine speed condition is not satisfied, then in step S2 the timer T1 is reset, and in step S3 vibration damping control is inhibited. Hence power supply to the electric motor 12 from the power drive unit 16 is stopped, and the present control is terminated.

Conversely, in the case where it is determined in step S5 that the engine speed condition is satisfied, flow proceeds toward vibration damping permission in step S6.

In this manner, the reason why flow proceeds toward vibration damping permission only when the engine speed Ne is within a prescribed range is to avoid a case where the engine speed Ne is too low, and the rotation of the engine not stable, thus creating a situation in which performing vibration damping control stops the engine. Furthermore, conversely in the case where the engine speed Ne is too high, little vibration that is unpleasant to occupants occurs, so that there is no requirement for vibration damping control to be performed. In addition, another reason is that it is desirable to use the engine output for driving as much as possible, and not for vibration damping.

In step S6 it is determined whether an engine negative pressure condition, being that the engine negative pressure PB is within a prescribed range, which when low can be used to determine that the engine load is low is satisfied or not, by a detection signal from the air intake passage pressure sensor 40.

Then, in the case where it is determined in step S6 that the engine negative pressure condition is not satisfied, in step S2 the timer T1 is reset, and in step S3 vibration damping control is inhibited. Hence power supply to the electric motor 12 from the power drive unit 16 is stopped, and the present control is terminated.

Conversely, in the case where it is determined in step S6 that the engine negative pressure condition is satisfied, flow proceeds toward vibration damping permission in step S7.

In this manner, the reason why flow proceeds toward vibration damping permission only when the engine negative pressure condition is within a prescribed range is to avoid a case where the engine negative pressure PB is too low, and the rotation of the engine 11 not stable, thus creating a situation in which performing vibration damping control stops the engine. Furthermore another reason is that conversely, in the case where the engine negative pressure PB is too high, which is a case where it is desired to put load onto the engine 11, it is desirable to use the engine output for driving as much as possible, and not for vibration damping.

Here, in this manner detection of the engine negative pressure PB is one means of determining the loading state of the engine. However, other sensors may be used to determine the engine load. In essence, it is sufficient to determine whether vibration damping control should be performed or not depending on the loading state of the engine.

In step S7 it is determined whether a vehicle speed condition, being that the vehicle speed V is less than a predetermined value that determines that the vehicle is stopped, is satisfied or not, by a detection signal from the vehicle speed sensor 36.

Then, in the case where it is determined in step S7 that the vehicle speed condition is not satisfied, in step SA2 the timer T1 is reset, and in step SA3 vibration damping control is inhibited. Hence power supply to the electric motor 12 from the power drive unit 16 is stopped, and the present control is terminated.

Conversely, in the case where it is determined in step S6 that the vehicle condition is satisfied, flow proceeds toward vibration damping permission in step S8.

In this manner, the reason why flow proceeds toward vibration damping permission only when the vehicle speed V is less than a predetermined value is that in the case where the vehicle travels at such a speed as is determined to be not stopped, the vehicle is influenced by factors other than engine vibration, such as the roughness of the road surface and the like, and performing vibration damping control at this time only for the engine is meaningless.

In step S8 it is determined whether a water temperature condition, being that the engine water temperature TW is greater than a predetermined value that determines that the engine 11 is warm enough, is satisfied or not, by a detection signal from the water temperature sensor 41.

Then, in the case where it is determined in step S7 that the water temperature condition is not satisfied, in step S2 the timer T1 is reset, and in step S3 vibration damping control is inhibited. Hence power supply to the electric motor 12 from the power drive unit 16 is stopped, and the present control is terminated.

Conversely, in the case where it is determined in step S8 that the water temperature condition is satisfied, flow proceeds toward vibration damping permission in step S9.

In this manner, the reason why flow proceeds toward vibration damping permission only when it is determined from the engine water temperature that the engine 11 is warm enough, is to avoid a case where performing vibration damping control stops the engine because the engine is not warm, but is being warmed, and the engine rotation is not stable.

Figure 4:
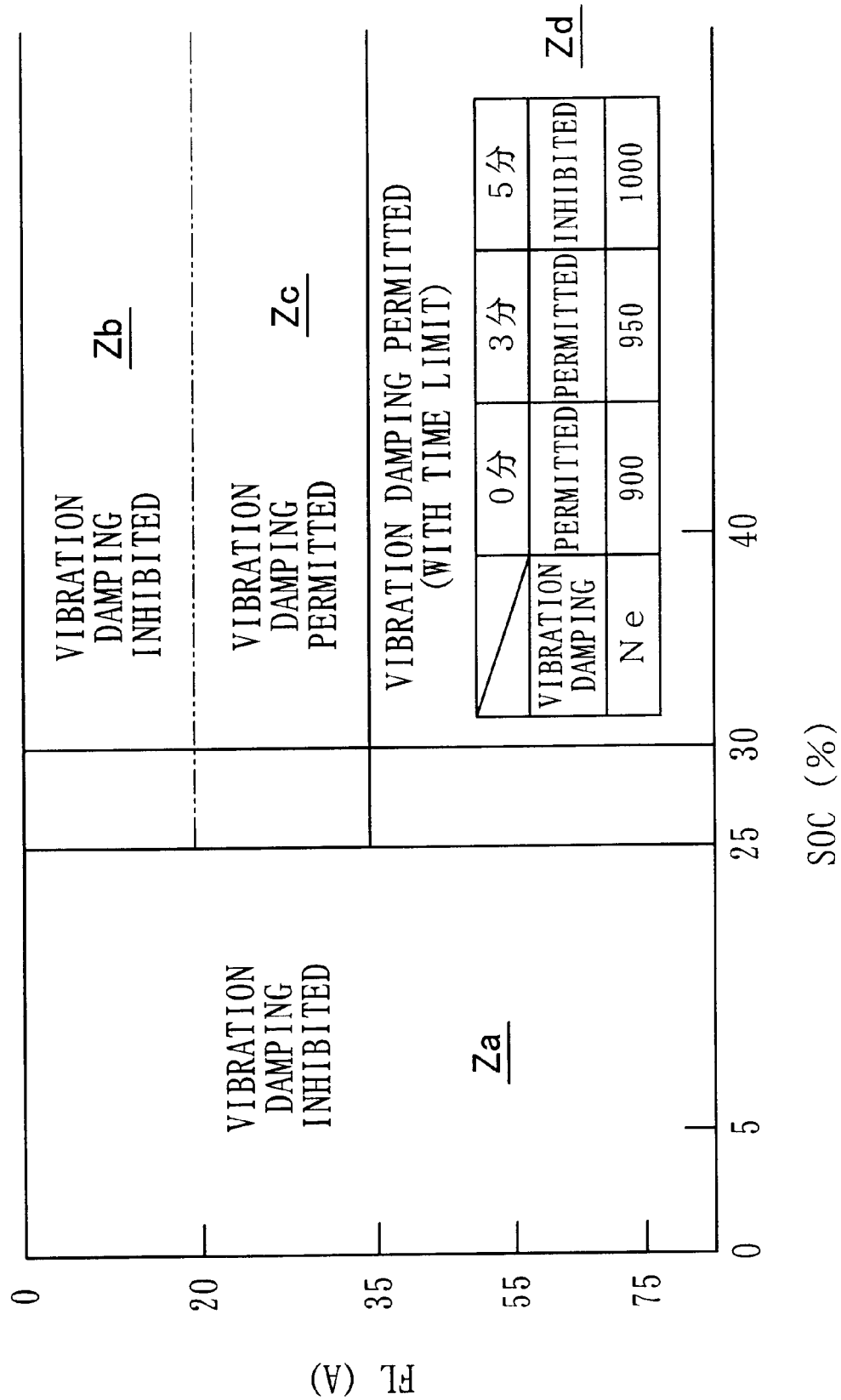
FIG. 4 shows a vibration damping inhibited region and a vibration damping permitted region based on stored charge SOC of an electric motor battery and current value detected by a current sensor 22 installed on a 12 volt system auxiliary equipment according to the first embodiment of the control apparatus for a hybrid vehicle of the present invention.

In step S9 it is determined whether a stored charge condition is satisfied or not, being that the stored charge SOC of the battery 17, which is monitored based on an output from the current sensor 24, is greater than a predetermined stored charge threshold (for example 25% in the case where the stored charge is falling, or 30% in the case where the stored charge is rising) that determines that it is sufficient for vibration damping control (refer to FIG. 4).

In the case where it is determined in step S9 that the stored charge condition is not satisfied, then in step S2 the timer T1 is reset, and in step S3 vibration damping control is inhibited. Hence power supply to the electric motor 12 from the power drive unit 16 is stopped Here, at this time a generation torque limit is set to a predetermined upper limit (for example, 1.5 kgfm), and the electric motor 12 may be controlled so as to charge the electric motor battery 17 via the power drive unit 16, such that the electric motor 12 generates electricity from the drive of the engine 11 within this torque limit.

Here, to describe FIG. 4, this shows regions (Za and Zb) where vibration damping control is inhibited, a region (Zc) where it is permitted, and furthermore a time limited permission region (Zd), based on only the stored charge SOC of the electric motor battery 17 monitored based on an output from the current sensor 24, and a current value EL, being a detection signal from the current sensor 22 installed on the 12 volt system auxiliary equipment 18.

That is to say, in FIG. 4 the horizontal axis represents the stored charge SOC of the battery 17, monitored based on an output from the current sensor 24, and the vertical axis represents current value EL, being a detection signal from the current sensor 22 installed on the 12 volt system auxiliary equipment 18.

As shown in FIG. 4, between the stored charge SOC of the electric motor battery and the current value EL, being a detection signal from the current sensor, the stored charge SOC of the electric motor battery 17 takes priority. Firstly, when this stored charge SOC is less than or equal to a predetermined stored charge threshold, that is, there is little surplus of stored charge SOC, vibration damping is inhibited (Za), and conversely when it is greater than the predetermined stored charge threshold, that is, there is some surplus of stored charge SOC, vibration damping is permitted (Zc and Zd).

Furthermore, even in the same vibration damping permitted regions, unrestricted vibration damping control may be performed without a time limit, or vibration damping control may be performed with a time limit, depending on the current value EL, being a detection signal from the current sensor 22, in other words the motor-driven load state of the vehicle at the present time excepting the electric motor. That is to say, in the case where the current value EL is less than or equal to a predetermined EL (electrical load) threshold (for example, 35 amps), vibration damping is permitted with no condition (Zc), and in the case where the current value EL exceeds the EL threshold value, vibration damping is permitted with a time limit (Zd). Details will be described later.

In the abovementioned step S9, in the case where it is determined that the stored charge condition is satisfied, then the battery 17 is not charged, the electric motor 12 is controlled by the power drive unit 16 normally such that the detection signal from the current sensor 24 attached to the electric motor battery 17, in other words the current value, becomes 0, and flow proceeds toward vibration damping permission in step S10.

In this manner, the reason why vibration damping control is permitted only in the case where the stored charge SOC of the electric motor battery 17 is greater than the predetermined stored charge threshold value, is to avoid a case where performing vibration damping control makes the electric power produced by the engine insufficient, because vibration damping control using the electric motor requires a certain amount of energy, and hence in the case where the power deficiency is drawn from the electric motor battery, if there is no surplus in the electric motor battery the stored charge of the electric motor battery 17 is reduced, and in an extreme case there is a possibility that assistance cannot be given to the engine by the electric motor even if required.

Furthermore, the reason why hysteresis is provided by setting two threshold values for the case where the stored charge is falling (25 percent in the case of this embodiment) and the case where the stored charge is rising (30 percent in the case of this embodiment), is to prevent control hunting.

Here, in this embodiment, the stored charge SOC of the battery 17 is monitored directly in order to detect the stored charge of the electric motor battery 17. Alternatively, the stored charge of the battery 17 may be monitored by detecting the discharge rate of the battery.

In step S10 it is determined whether a 12 volt system consumption condition is satisfied or not, by a detection signal from the current sensor 22, being that a current value EL (electrical load of the vehicle except the electric motor) from the current sensor 22, indicating the amount of electricity consumed by the 12 volt system auxiliary equipment 18, is less than or equal to a predetermined electrical load threshold (for example, 35 amps) that determines that in the case where vibration damping control is performed by the electric motor 12, the current value EL is an amount such that electricity is drawn from the battery 17.

Then, in the case where the 12 volt system consumption condition is satisfied in step S10, vibration damping control can be performed without any problem at the battery 17 side, and with no time limit provided. Therefore, in step S11 power is supplied to the electric motor 12 by the power drive unit 16, vibration damping control is set to an active state, and the present control is terminated.

Conversely, in the case where it is determined in step S10 that the 12 volt system consumption condition is not satisfied, flow proceeds to step S12. Then, although vibration damping control is permitted, the arrangement is such that vibration damping control is permitted but for a predetermined time limit, and also engine speed is increased as the elapsed time of vibration damping control increases. To be specific, this is described in the following steps S12 through step S18.

Firstly, in step S12, the time of the timer T1 is determined.

In the case where, in step S12, the time of the timer T1 is less than a predetermined first stage time (specifically shorter than 3 minutes) that determines that an idling state has just begun and so there is little influence on the stored charge SOC of the battery 17, then in step S13 the idling speed Ne of the engine 11 is set to a low predetermined fixed first idling speed (specifically 900 rpm), by the injectors 32 and the air valve 34, and in step S14 power is supplied to the electric motor 12 from the power drive unit 16, vibration damping control is set to an active state, and the present control is terminated.

Furthermore, in the case where, in step 12, the time of the timer T1 is less than a predetermined second stage time (specifically shorter than 5 minutes) that determines that the idling state has continued for a long time and so there is some influence on the stored charge SOC, then in step S15 the idling speed Ne of the engine 11 is set to a predetermined second idling speed (specifically 950 rpm), which is higher than the first idling speed, by the injectors 32 and the air valve 34, and in step S16 power is supplied to the electric motor 12 from the power drive unit 16, vibration damping control is set to an active state, and the present control is terminated.

Moreover, in the case where, in step S12, the time of the timer T1 is greater than or equal to the predetermined second stage time (specifically greater than or equal to 5 minutes) that determines that the idling state has continued for a significantly long time and so there is a considerable influence on the stored charge SOC, then in step S17 the idling speed Ne of the engine 11 is set to a predetermined third idling speed (specifically 1000 rpm), which is higher than the second idling speed, by the injectors 32 and the air valve 34, and in step S18 vibration damping control is inhibited. Hence power supply to the electric motor 12 from the power drive unit 16 is stopped, and the present control is terminated.

In this manner, the reason why vibration damping is permitted unconditionally, with no time limit, in the case where the current value EL, being a signal detected from the current sensor 22, is less than or equal to the predetermined EL threshold, is that there is little possibility that the stored charge of the battery has decreased considerably because the current value EL is small, so the engine 11 can generate a sufficient electricity supply even if vibration damping control is performed, with a result that even if vibration damping control is performed for a long time, the amount of power drawn from the electric motor battery 17 is small.

Conversely, the reason why vibration damping is permitted with a time limit in the case where the current value EL, being a detection signal from the current sensor 22, exceeds the predetermined EL threshold, is that there is a possibility that the stored charge of the electric motor battery may reduce significantly if there is no time limit, because the electrical load of the vehicle at the present time is high, so if further vibration damping control is performed, then the amount of power drawn from the electric motor battery 17 will increase.

Furthermore, the reason why the engine speed Ne is increased as the elapsed time of vibration damping control increases when vibration damping control is performed within a predetermined time limit (Zd), is that an increase in engine speed increases the electric power produced by the engine 11, thus reducing the amount of power drawn from the electric motor battery 17.

Moreover, the reason why the engine speed is increased in stages (900 rpm ? 950 rpm? 1000 rpm) as the elapsed time of vibration damping control increases as mentioned above, is that after a predetermined time (five minutes in this embodiment) has passed, if vibration damping control is suddenly discontinued while the engine speed is low, the unpleasant sensation experienced by occupants increases, but in the case where vibration damping control is discontinued in a state where the engine speed is increased in stages in this manner, there is a lower sensation of vibration and the occupants experience little unpleasantness.

Figure 2:
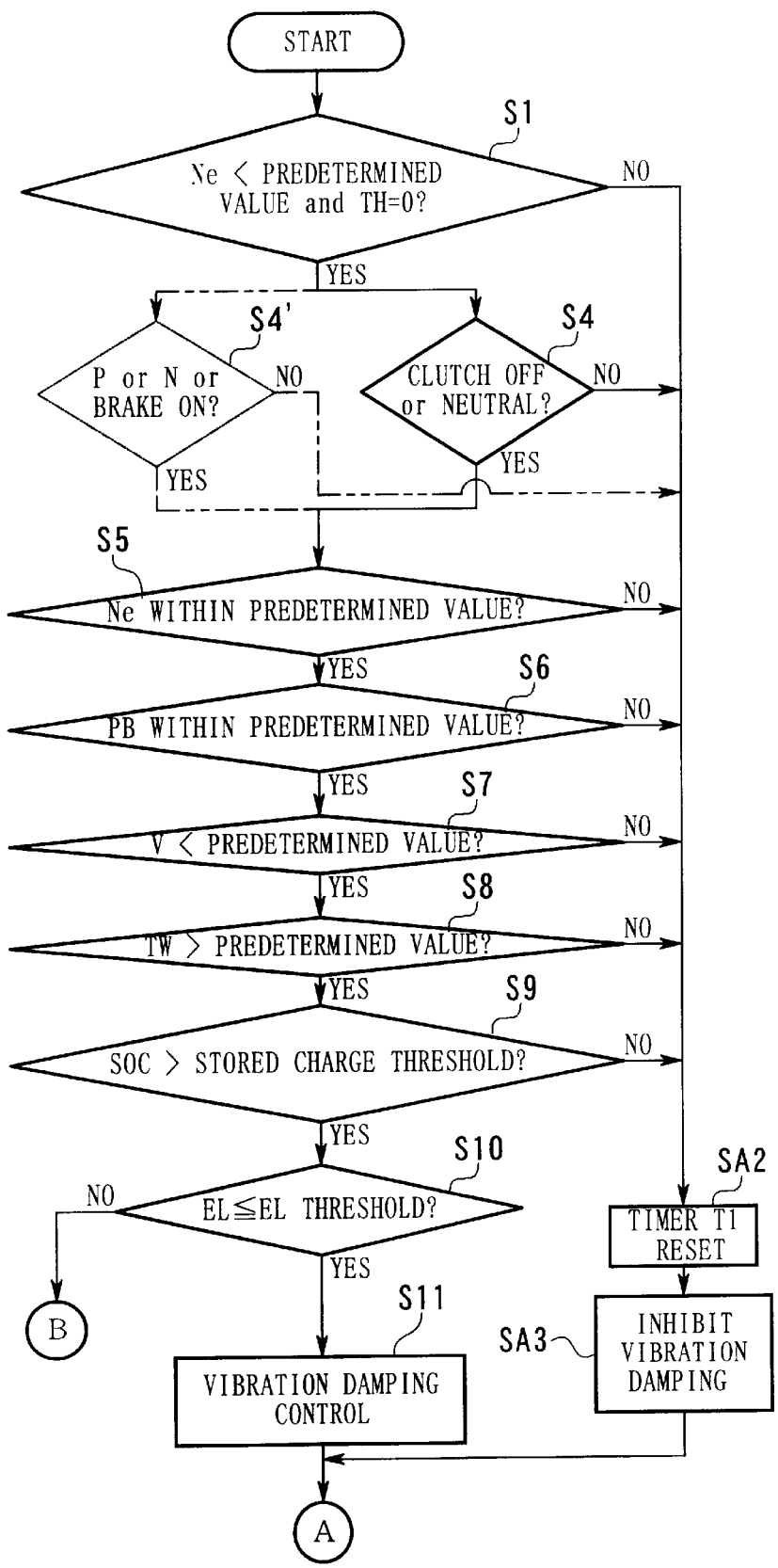
FIG. 2 is a flow chart showing a part of the control content of vibration damping permission determination control according to the first embodiment of the control apparatus for a hybrid vehicle of the present invention.
Figure 3:
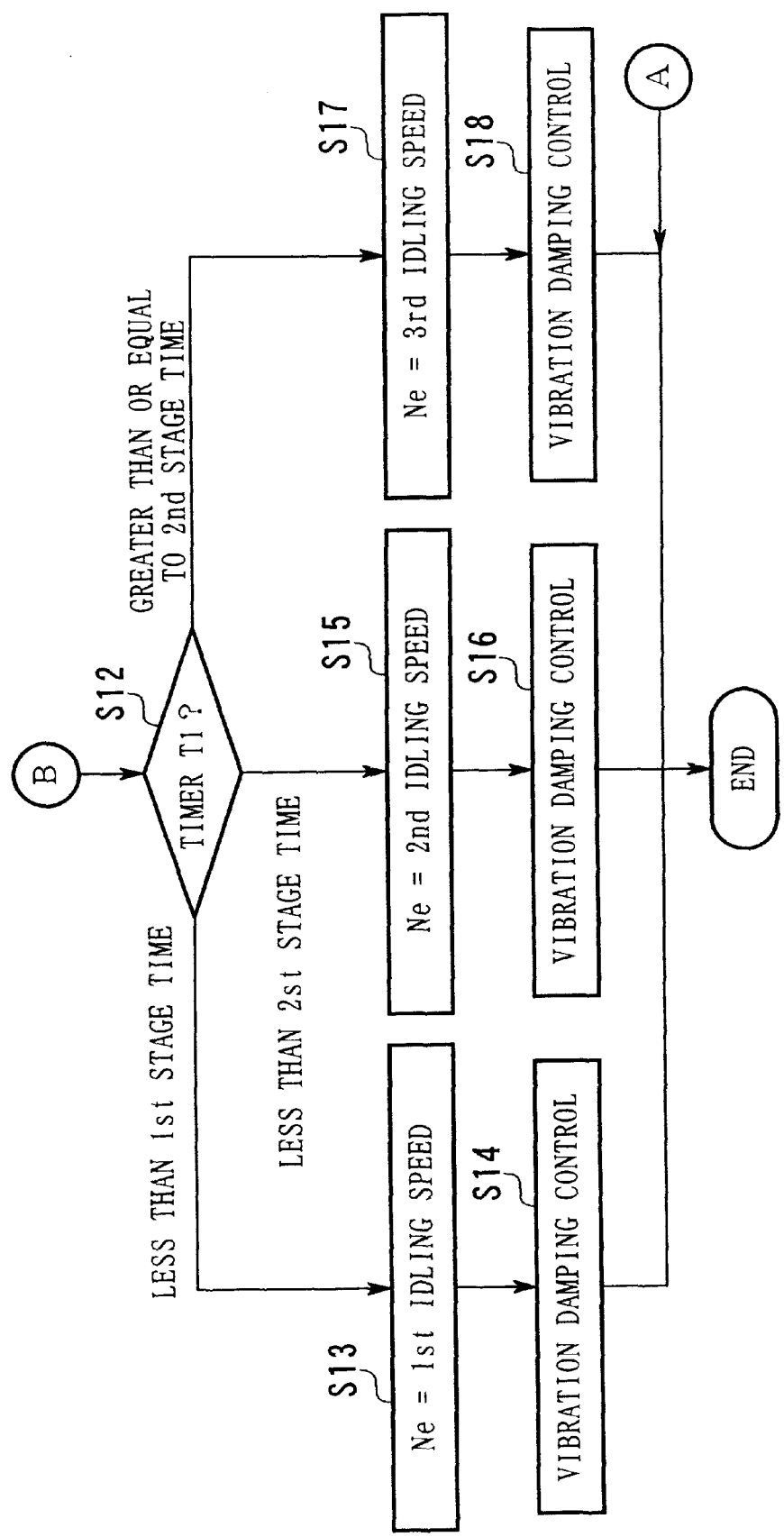
FIG. 3 is a flow chart showing another part of the control content of the vibration damping permission determination control according to the first embodiment of the control apparatus for a hybrid vehicle of the present invention.

Here, as shown in FIG. 4, while not described in the flow charts in FIG. 2 and FIG. 3, in the case where the current value EL, being a detection signal from the current sensor 22, is less than a predetermined EL minimum threshold (20A in this embodiment), even if the stored charge SOC of the battery is greater than or equal to the stored charge threshold value, vibration damping control is inhibited (refer to Zb in the figure). To be specific, this is a case where the air conditioner is disengaged, and the power transmission system is in a disengaged state, or the like, and so the electrical load of the vehicle is extremely small, and hence the load added to the engine 11 is small, so there is no need to perform vibration damping.

In this manner, if the stored charge SOC of the battery 17 detected by the current sensor 24 and the ECU 15 becomes less than or equal to the predetermined stored charge threshold, by inhibiting vibration damping control by the electric motor 12, power consumption is reduced, and further reduction of the stored charge of the electric motor battery 17 is avoided as much as possible.

Furthermore, even in the case where the stored charge SOC of the battery 17 detected by the current sensor 24 and the ECU 15 exceeds the predetermined stored charge threshold, when the current value EL, being a detection signal from the current sensor 22, exceeds the predetermined EL threshold, vibration damping control is permitted with a time limit. In this manner, performing vibration damping control prevents an unrestricted large amount of power from being drawn continuously from the electric motor battery 17 in advance, so that the stored charge of the electric motor battery 17 can be maintained.

Second Embodiment

Hereunder is a description of a second embodiment of a control apparatus for a hybrid vehicle of the present invention with reference to drawings. Here, in the following description, the same symbols are used for similar elements to the first embodiment, and detailed descriptions are omitted.

Figure 5:
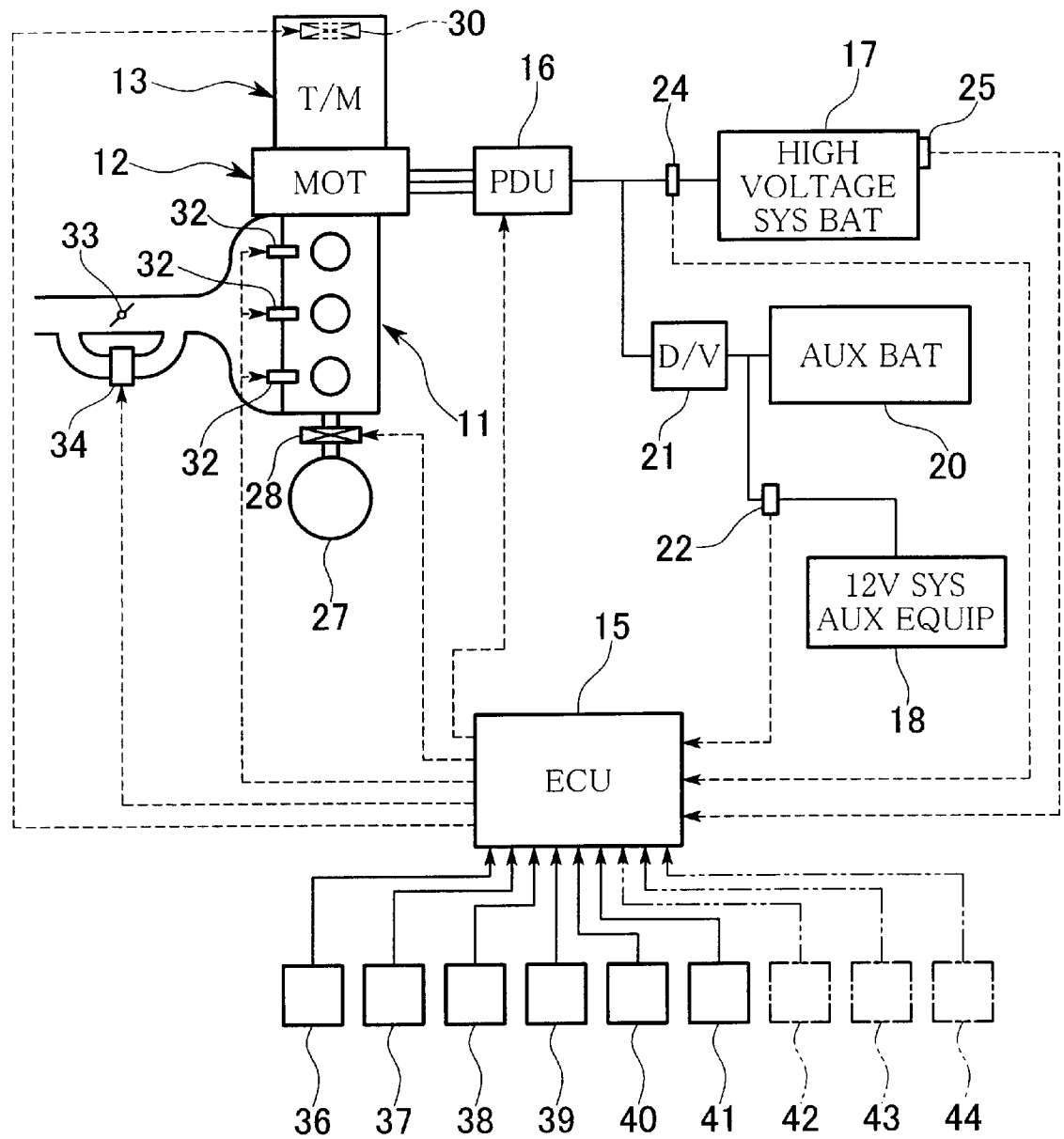
FIG. 5 is a schematic diagram showing an overall structure of a hybrid vehicle containing a second embodiment of a control apparatus of a hybrid vehicle of the present invention.

FIG. 5 is a schematic diagram showing an overall structure of a parallel type hybrid vehicle of the second embodiment of a control apparatus of a hybrid vehicle of the present invention.

An engine 11 is linked to a compressor 27 of an air conditioner, being auxiliary equipment, via a clutch 28. The compressor 27 is driven by the engine 11 when the clutch 28 is engaged by a control instruction from an ECU 15, and is disconnected from the drive of the engine 11 when the clutch is disengaged by a control instruction from the ECU 15. The drive torque to drive this compressor 27 is a mechanical load on the engine 11.

Furthermore, in the case of an automatic transmission, a transmission 13 incorporates a clutch 30 for controlling the transmission of driving force from the engine 11 to the driving wheels under control instructions from the ECU 15. In the case where the D position of the transmission 13 is selected, even when idling the ECU 15 does not normally cut transmission of the driving force from the engine 11 to the driving wheels completely by this clutch 30, but induces so-called creeping torque. Such creeping torque of the drive transmission system is also a mechanical load on the engine 11.

The control content of the ECU 15 will be described with reference to the flow charts in FIG. 6 through FIG. 9.

Figure 6:
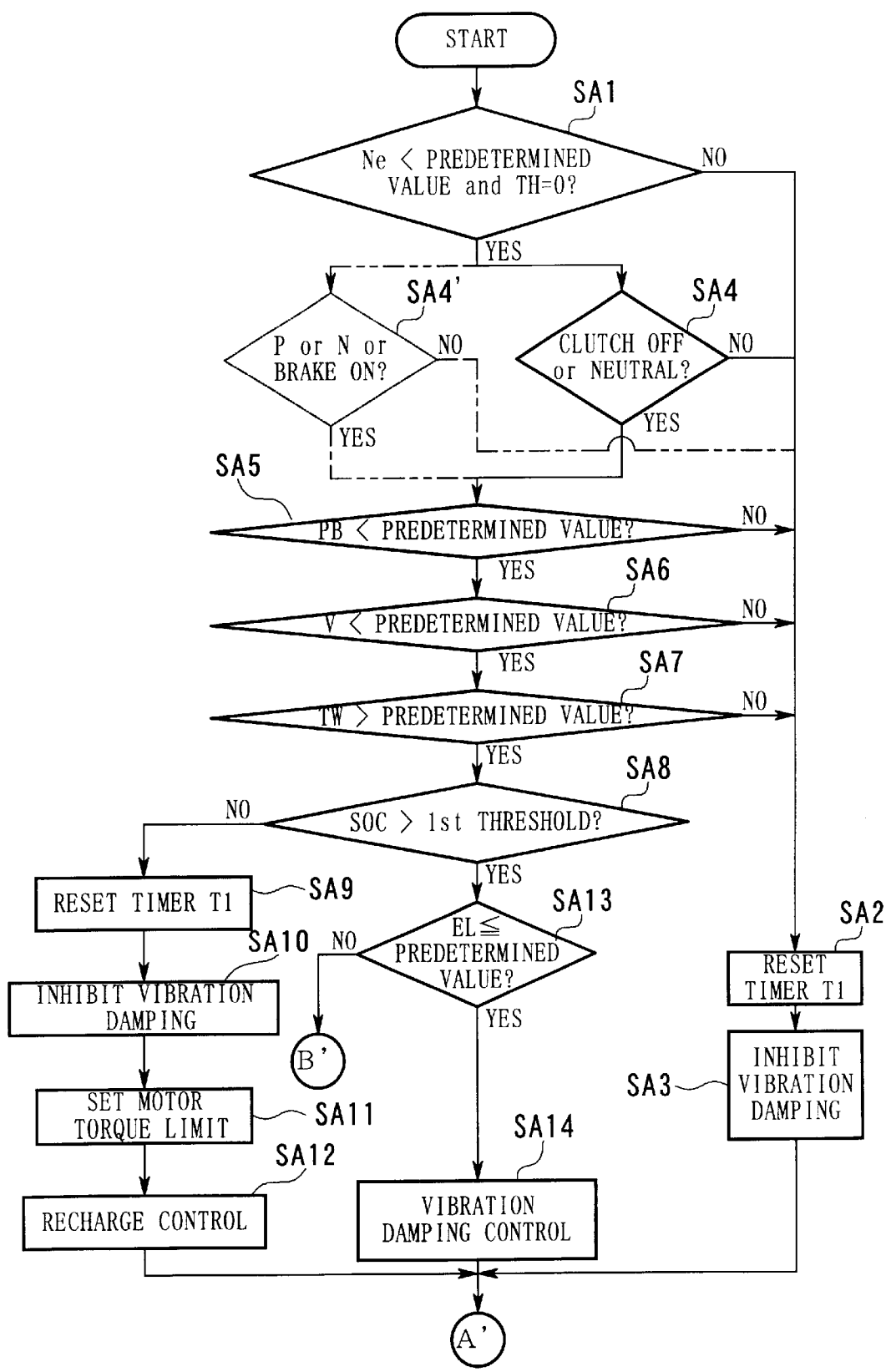
FIG. 6 is a flow chart showing a part of the control content of vibration damping permission determination control according to the second embodiment of a control apparatus for a hybrid vehicle of the present invention.
Figure 7:
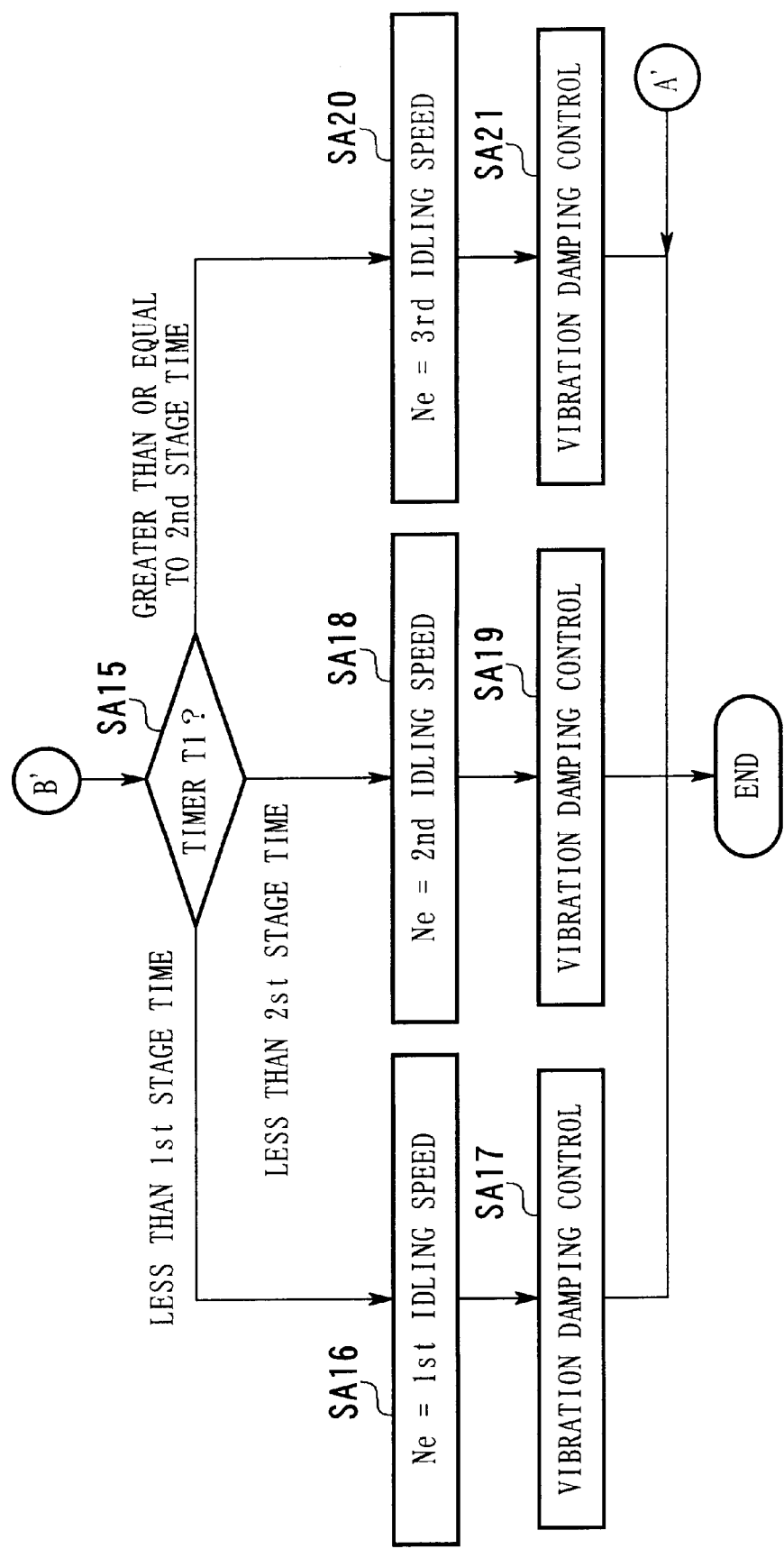
FIG. 7 is a flow chart showing another part of the control content of the vibration damping permission determination control according to the second embodiment of a control apparatus for a hybrid vehicle of the present invention.

The ECU 15 performs vibration damping permission determination control of whether or not conditions are in a region where performing vibration damping control is permitted for suppressing vibration of the engine 11 by controlling power supplied to the electric motor 12, as follows (refer to FIG. 6 and FIG. 7).

That is to say, in step SA1 it is determined whether an idling condition, from which it can be determined that the engine 11 is idling, is satisfied or not, by whether two conditions are satisfied or not by detection signals from the engine speed sensor 37 and the throttle opening sensor 39, the two conditions being a rotational speed condition in that the engine speed Ne is less than a predetermined value, and a valve opening condition in that the throttle valve opening TH is 0.

In the case where it is determined in step SA1 that at least one of the rotational speed condition and the valve opening condition is not satisfied, thus not satisfying the idling condition, a timer T1 is reset in step SA2, and vibration damping control is inhibited in step SA3. Hence power supply to the electric motor 12 from the power drive unit 16 is stopped, and the present control terminates.

Furthermore, in the case where it is determined in step SA1 that the rotational speed condition and the valve opening condition are both satisfied, thus satisfying the idling condition, and also the transmission 13 is a manual transmission, then in step S4 it is determined whether a transmission system condition is satisfied or not by whether at least one of a clutch disengaged condition, being that the clutch is disengaged, or a neutral condition, being that the gear shift is in neutral, is satisfied or not, by detection signals from the clutch switch 43 and the neutral switch 44.

On the other hand, in the case where it is determined in step SA1 that the rotational speed condition and valve opening condition are both satisfied, thus satisfying the idling condition, and also the transmission 13 is an automatic transmission, then in step SA4' it is determined whether a transmission system condition is satisfied or not by whether at least one of a drive disengaged condition, being that the gear shift is in P position or N position, and a brake on condition, being that the brake is on, is satisfied or not, by detection signals from the shift position sensor 42 and the brake switch 38.

If the transmission 13 is a manual transmission, in the case where it is determined in step SA4 that neither the clutch disengaged condition nor the neutral condition is satisfied, thus not satisfying the transmission system condition, then in step SA2 a timer T1 is reset, and in step SA3 vibration damping control is inhibited. Hence power supply to the electric motor 12 from the power drive unit 16 is stopped, and the present control is terminated.

On the other hand, if the transmission 13 is an automatic transmission, in the case where it is determined in step SA4' that neither the drive disengaged condition nor the brake on condition is satisfied, thus not satisfying the transmission system condition, then in step SA2 the timer T1 is reset, and in step SA3 vibration damping control is inhibited. Hence power supply to the electric motor 12 from the power drive unit 16 is stopped, and the present control is terminated.

Conversely, if the transmission 13 is a manual transmission, in the case where it is determined in step SA4 that at least one of the clutch disengaged condition and the neutral condition is satisfied, thus satisfying the transmission system condition, flow proceeds toward vibration damping permission in step SA5.

On the other hand, if the transmission 13 is an automatic transmission, in the case where it is determined in step SA4'that at least one of the drive disengaged condition and the brake on condition is satisfied, thus satisfying the transmission system condition, flow proceeds toward vibration damping permission in step S5.

In step S5 it is determined whether an engine negative pressure condition, being that the engine negative pressure PB, indicating the engine load, is less than a prescribed value which when low can be used to determine that the engine load is low, is satisfied or not, by a detection signal from the air intake passage pressure sensor 40.

Then, in the case where it is determined in step SA5 that the engine negative pressure condition is not satisfied, in step SA2 the timer T1 is reset, and in step SA3 vibration damping control is inhibited. Hence power supply to the electric motor 12 from the power drive unit 16 is stopped, and the present control is terminated. Conversely, in the case where it is determined in step SA5 that the engine negative pressure condition is satisfied, then in step S6 it is determined whether a vehicle speed condition, being that the vehicle speed V is less than a predetermined value that determines that the vehicle is stopped, is satisfied or not, by a detection signal from the vehicle speed sensor 36.

Then, in the case where it is determined in step SA6 that the vehicle condition is not satisfied, in step SA2 the timer T1 is reset, and in step SA3 vibration damping control is inhibited. Hence power supply to the electric motor 12 from the power drive unit 16 is stopped, and the present control is terminated.

Conversely, in the case where it is determined in step SA6 that the vehicle speed condition is satisfied, then in step SA7 it is determined whether a water temperature condition, being that the engine water temperature TW is greater than a predetermined value that determines that the engine 11 is warm enough, is satisfied or not, by a detection signal from the water temperature sensor 41.

Then, in the case where it is determined in step SA7 that the water temperature condition is not satisfied, in step SA2 the timer T1 is reset, and in step SA3 vibration damping control is inhibited. Hence power supply to the electric motor 12 from the power drive unit 16 is stopped, and the present control is terminated.

Conversely, in the case where it is determined in step SA7 that the water temperature condition is satisfied, then in step SA8 it is determined whether a stored charge condition is satisfied or not, being that the stored charge SOC of the battery 17, which is monitored based on an output from the current sensor 24, is greater than a predetermined stored charge threshold (for example 25%) that determines that it is sufficient for vibration damping control.

In the case where it is determined in step SA8 that the stored charge condition is not satisfied, then in step SA9 the timer T1 is reset, and in step SA10 vibration damping control is inhibited. Hence power supply to the electric motor 12 from the power drive unit 16 is stopped. Then, in step SA11, a generation torque limit is set to a predetermined first upper limit (for example, 1.5 kgfm), and the electric motor 12 is controlled so as to charge the electric motor battery 17 via the power drive unit 16, such that the electric motor 12 generates electricity from the drive of the engine 11 within this torque limit. At this time, the power drive unit 16 controls how much generation torque the electric motor 12 generates according to the characteristics shown in FIG. 10.

That is to say, in FIG. 10 the horizontal axis represents current value EL, being a detection signal from a current sensor 22 installed on a 12 volt system auxiliary equipment 18, and the vertical axis represents generation torque of the electric motor 12. Line a in FIG. 10 represents the electrical load by the 12 volt system auxiliary equipment 18, and line b in FIG. 10 represents a control line when the transmission 13 is an automatic transmission, a clutch 28 of an air conditioner is engaged, a compressor 27 is on, and a condition determined from a detection signal from a shift position sensor 42, where a clutch 30 is engaged but slipping, and creeping torque occurs on the driving side, in other words, that the gear shift is in D position.

Furthermore, line c in FIG. 10 represents a control line when the transmission 13 is a manual transmission and the compressor 27 of the air conditioner is turned on, or when the transmission 13 is an automatic transmission, the compressor 27 of the air conditioner is turned on, and creeping torque occurs on the driving side.

Moreover, line d in FIG. 10 represents a control line when the transmission 13 is a manual transmission and the compressor 27 of the air conditioner is turned off, or when the transmission 13 is an automatic transmission, the compressor 27 of the air conditioner is turned off, and creeping torque does not occur on the driving side.

If control is performed according to these control lines, for example, in the case where the transmission 13 is an automatic transmission, the current value EL, being a detection signal from the current sensor 22, is 10 amps, and in a situation where the compressor 27 is on and creeping torque occurs, that is, in a situation where the mechanical load on the engine 11 is high, the electric motor 12 is controlled by the power drive unit 16 such that the generation torque of the electric motor 12 is reduced according to the control line b. Furthermore, when the compressor 27 is on, or when creeping torque occurs, that is, in a situation where the mechanical load on the engine 11 is low, the electric motor 12 is controlled by the power drive unit 16 such that the generation torque of the electric motor 12 is increased higher than the above described value according to the control line c. Moreover, in a situation where the compressor 27 is off, and creeping torque does not occur, that is, in a situation where the mechanical load on the engine 11 is even lower, the electric motor 12 is controlled by the power drive unit 16 such that the generation torque of the electric motor 12 is increased higher than the above described value according to the control line d.

As described above, in a situation where the mechanical load other than the electric motor 12 is high, then if the generation torque of the electric motor 12 is high, the load on the engine 11 becomes high. Hence the generation torque of the electric motor 12 is reduced. In a situation where the mechanical load other than the electric motor 12 is low, then even if the generation torque of the electric motor 12 is increased, the load on the engine 11 does not become great. Hence generation torque of the electric motor 12 is increased.

Conversely, in step SA8, in the case where it is determined that the stored charge condition is satisfied, then the battery 17 is not charged, and hence the electric motor 12 is controlled by the power drive unit 16 normally such that the detection signal from the current sensor 24 attached to the battery 17, in other words the current value, becomes 0. Moreover, in step SA13 it is determined whether a 12 volt system consumption condition is satisfied or not, by a detection signal from the current sensor 22, being that a current value EL from the current sensor 22, indicating the amount of electricity consumed by the 12 volt system auxiliary equipment 18, is less than or equal to a predetermined value (for example, 35 amps) that determines that in the case where vibration damping control is performed by the electric motor 12, the current value EL is an amount such that electricity is drawn from the battery 17.

Then, in the case where the 12 volt system consumption condition is satisfied in step SA13, vibration damping control can be performed without any problem at the battery 17 side. Therefore, in step SA14 power is supplied to the electric motor 12 by the power drive unit 16, vibration damping control is set to an active state, and the present control is terminated.

Conversely, in the case where it is determined in step SA12 that the 12 volt system consumption condition is not satisfied, in step SA15 the time of the timer T1 is determined.

In the case where, in step SA15, the time of the timer T1 is less than a predetermined first stage time (specifically shorter than 3 minutes) that determines that an idling state has just begun and so there is little influence on the stored charge SOC of the battery 17, then in step SA16 the idling speed Ne of the engine 11 is set to a low predetermined fixed first idling speed (specifically 900 rpm), by the injectors 32 and the air valve 34, and in step SA17 power is supplied to the electric motor 12 from the power drive unit 16, vibration damping control is set to an active state, and the present control is terminated.

Furthermore, in the case where, in step SA15, the time of the timer T1 is less than a predetermined second stage time (specifically shorter than 5 minutes) that determines that the idling state has continued for a long time and so there is some influence on the stored charge SOC, then in step SA18 the idling speed Ne of the engine 11 is set to a predetermined second idling speed (specifically 950 rpm), which is higher than the first idling speed, by the injectors 32 and the air valve 34, and in step SA19 power is supplied to the electric motor 12 from the power drive unit 16, vibration damping control is set to an active state, and the present control is terminated.

Moreover, in the case where, in step SA15, the time of the timer T1 is greater than or equal to the predetermined second stage time (specifically greater than or equal to 5 minutes) that determines that the idling state has continued for a considerably long time and so there is a considerable influence on the stored charge SOC, then in step SA20 the idling speed Ne of the engine 11 is set to a predetermined third idling speed (specifically 1000 rpm), which is higher than the second idling speed, by the injectors 32 and the air valve 34, and in step SA21 vibration damping control is inhibited. Hence power supply to the electric motor 12 from the power drive unit 16 is stopped, and the present control is terminated.

Figure 8:
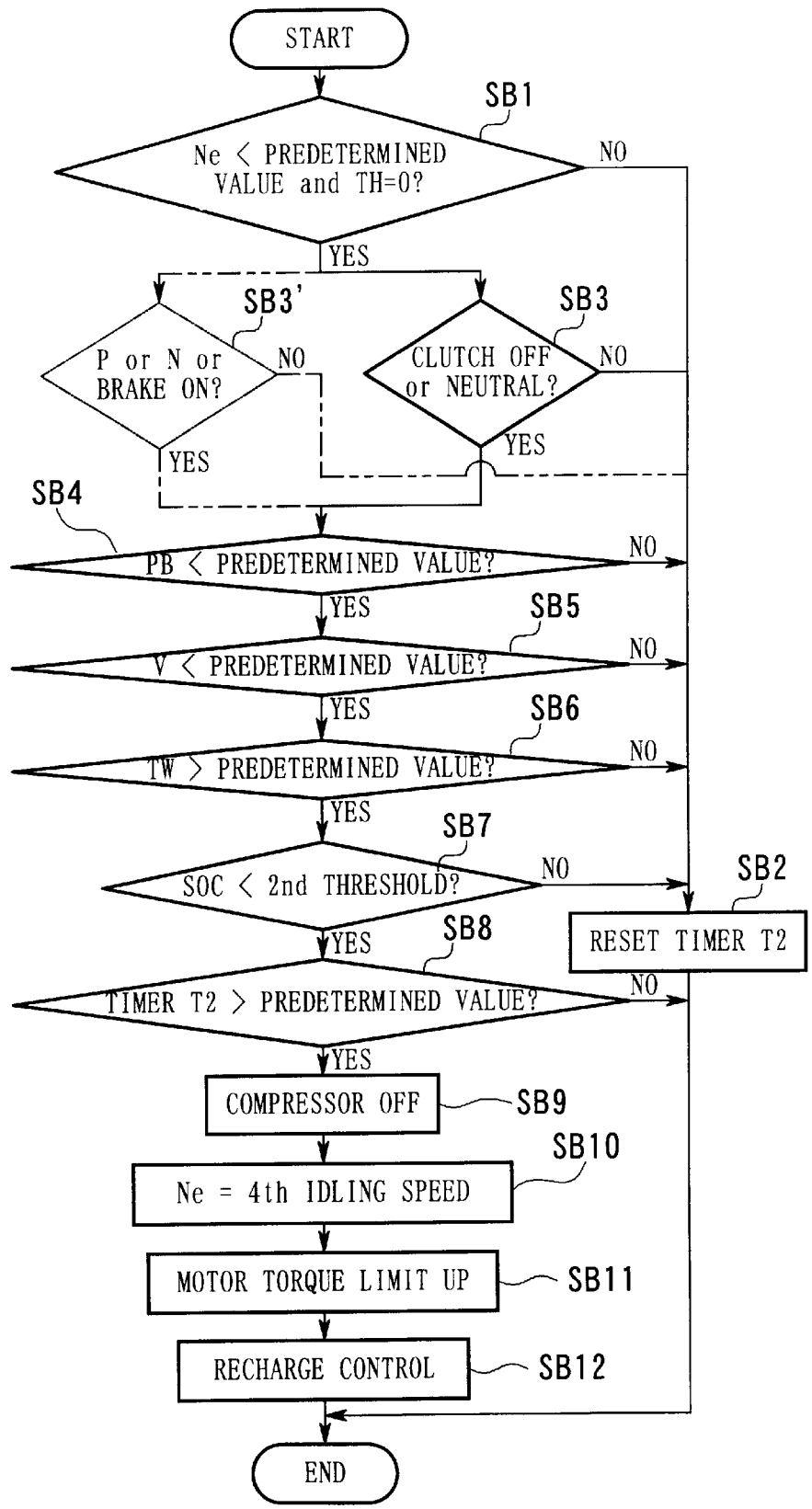
FIG. 8 is a flow chart showing the control content of a first mechanical load control according to the second embodiment of a control apparatus for a hybrid vehicle of the present invention.

In this embodiment, the ECU 15 further controls the following first mechanical load control, concurrently with the vibration damping permission determination control (refer to FIG. 8).

Firstly, in step SB1 it is determined whether an idling condition, from which it can be determined that the engine 11 is idling, is satisfied or not, by whether two conditions are satisfied or not by detection signals from the engine speed sensor 37 and the throttle opening sensor 39, the two conditions being a rotational speed condition in that the engine speed Ne is less than a predetermined value, and a valve opening condition in that the throttle valve opening TH is 0.

In the case where it is determined in step SB1 that at least one of the rotational speed condition and the valve opening condition is not satisfied, thus not satisfying the idling condition, a timer T1 is reset in step SB2, and the present control terminates.

Furthermore, in the case where it is determined in step SB1 that the rotational speed condition and the valve opening condition are both satisfied, thus satisfying the idling condition, and also the transmission 13 is a manual transmission, then in step SB3 it is determined whether a transmission system condition is satisfied or not by whether at least one of a clutch disengaged condition, being that the clutch is disengaged, and a neutral condition, being that the gear shift is in neutral is satisfied, by detection signals from the clutch switch 43 and the neutral switch 44.

On the other hand, in the case where it is determined in step SB1 that the rotational speed condition and valve opening condition are both satisfied, thus satisfying the idling condition, and also the transmission 13 is an automatic transmission, then in step SB3' it is determined whether a transmission system condition is satisfied or not by whether at least one of a drive disengaged condition, being that the gear shift is in P position or N position, and a brake on condition, being that the brake is on is satisfied, by detection signals from the shift position sensor 42 and the brake switch 38.

If the transmission 13 is a manual transmission, in the case where it is determined in step SB3 that neither the clutch disengaged condition nor the neutral condition is satisfied, thus not satisfying the transmission system condition, then in step SB2 a timer T1 is reset, and the present control is terminated.

On the other hand, if the transmission 13 is an automatic transmission, in the case where it is determined in step SB3' that neither the drive disengaged condition nor the brake on condition is satisfied, thus not satisfying the transmission system condition, in step SB2 the timer T2 is reset, and the present control is terminated.

Conversely, if the transmission 13 is a manual transmission, in the case where it is determined in step SB3 that at least one of the clutch disengaged condition and the neutral condition is satisfied, thus satisfying the transmission system condition, flow proceeds to step SB4.

On the other hand, if the transmission 13 is an automatic transmission, in the case where it is determined in step SB3' that at least one of the drive disengaged condition and the brake on condition is satisfied, thus satisfying the transmission system condition, flow proceeds to step SB4.

In step SB4 it is determined whether an engine negative pressure condition, being that the engine negative pressure PB, indicating the engine load, is less than a prescribed value which when low can be used to determine that the engine load is low, is satisfied or not, by a detection signal from the air intake passage pressure sensor 40.

Then, in the case where it is determined in step SB4 that the engine negative pressure condition is not satisfied, in step SB2 the timer T2 is reset, and the present control is terminated.

Conversely, in the case where it is determined in step SB4 that the engine negative pressure condition is satisfied, then in step SB5 it is determined whether a vehicle speed condition, being that the vehicle speed V is less than a predetermined value that determines that the vehicle is stopped, is satisfied or not, by a detection signal from the vehicle speed sensor 36.

Then, in the case where it is determined in step SB5 that the vehicle condition is not satisfied, in step SB2 the timer T2 is reset, and the present control is terminated.

Conversely, in the case where it is determined in step SB5 that the vehicle speed condition is satisfied, then in step SB6 it is determined whether a water temperature condition, being that the engine water temperature TW is greater than a predetermined value that determines that the engine 11 is warm enough, is satisfied or not, by a detection signal from the water temperature sensor 41.

Then, in the case where it is determined in step SB6 that the water temperature condition is not satisfied, the timer T2 is reset, and the present control is terminated.

Conversely, in the case where it is determined in step SB6 that the water temperature condition is satisfied, then in step SB7 it is determined whether a stored charge condition is satisfied or not, being that the stored charge SOC of the battery 17, which is monitored based on an output from the current sensor 24, is below a predetermined second threshold (lower value than the first threshold, for example 25%) that determines whether it subsequently has an influence on assistance control of the engine 11 by the electric motor 12.

Then, in the case where the stored charge SOC is not below the second threshold in step SB7, the timer T2 is reset in step SB2, and the present control is terminated.

Conversely, in the case where the stored charge SOC is below the second threshold in step SB7, it is determined in step SB8 whether the time of the timer T2, from when the stored charge SOC of the battery 17 dropped below the second threshold, is greater or not than a predetermined value for determining whether this drop is temporary.

Then, in the case where the time of the timer T2 is not greater than the predetermined value in step SB8, the present control is terminated.

Conversely, in the case where the time of the timer T2 is greater than the predetermined value in step SB8, then in step SB9 the clutch 28 for the compressor 27 of the air conditioner is disengaged, the compressor is disconnected from the engine 11, and the drive torque, that is the mechanical load, is reduced.

In the following step SB10, the injectors 32 and the air valve 34 are controlled to increase the idling speed Ne of the engine 11 to a predetermined fourth idling speed (greater than the abovementioned third idling speed (specifically 1100 rpm)) that determines that sufficient generation torque can be obtained.

In the following step SB11, when the electric motor 12 generates electricity from the drive of the engine 11, the generation torque limit is set to a predetermined second upper limit wherein an allowance for a mechanical load that is required to drive the compressor 27 is added to the abovementioned first upper limit (for example 1.8 kgfm), and in step SB12 the charging of the electric motor 12 is controlled by the power drive unit 16, such that the electric motor 12 generates electricity from the drive of the engine 11 within a range where the generation torque does not exceed this second upper limit.

Figure 9:
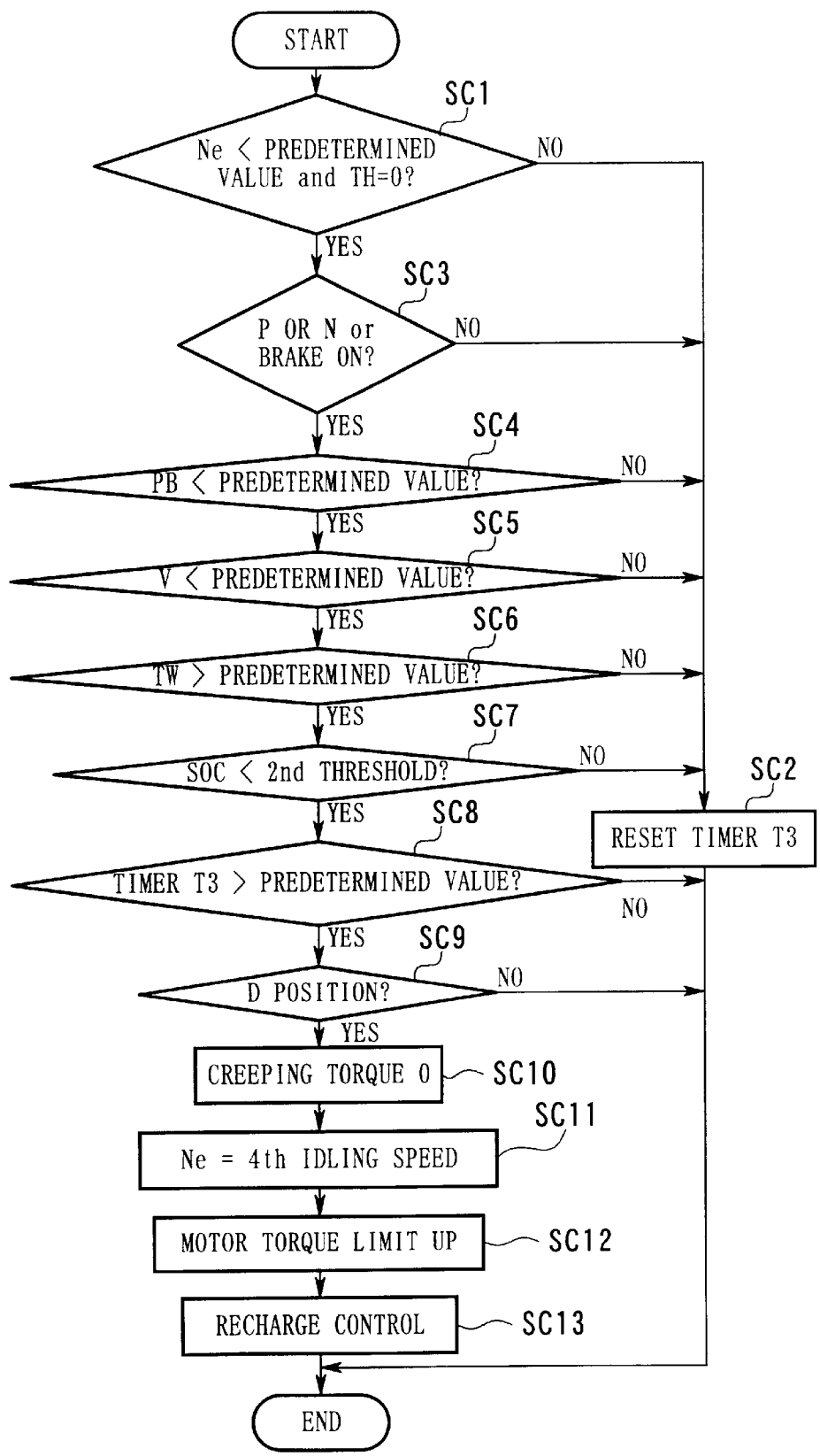
FIG. 9 is a flow chart showing the control content of a second mechanical load control according to the second embodiment of a control apparatus for a hybrid vehicle of the present invention.

In addition, in this embodiment, the ECU 15 further performs the following second mechanical load control, concurrently with the vibration damping permission determination control and first mechanical load control, provided the transmission 13 is an automatic transmission (refer to FIG. 9).

Firstly, in step SC1 it is determined whether an idling condition, from which it can be determined that the engine 11 is idling, is satisfied or not, by whether two conditions are satisfied or not by detection signals from the engine speed sensor 37 and the throttle opening sensor 39, the two conditions being a rotational speed condition in that the engine speed Ne is less than a predetermined value, and a valve opening condition in that the throttle valve opening TH is 0.

In the case where it is determined in step SC1 that at least one of the rotational speed condition and the valve opening condition is not satisfied, thus not satisfying the idling condition, a timer T3 is reset in step SC2, and the present control terminates.

Furthermore, in the case where it is determined in step SC1 that the rotational speed condition and the valve opening condition are both satisfied, thus satisfying the idling condition, then in step SC3 it is determined whether a transmission system condition is satisfied or not by whether at least one of a drive disengaged condition, being that the gear shift is in P position or N position, and a brake on condition, being that the brake is on is satisfied, by detection signals from the shift position sensor 42 and the brake switch 38.

Then, in the case where it is determined in step SC3' that neither the drive disengaged condition nor the brake on condition is satisfied, thus not satisfying the transmission system condition, in step SC2 the timer T3 is reset, and the present control is terminated.

Conversely, in the case where it is determined in step SC3' that at least one of the drive disengaged condition and the brake on condition is satisfied, thus satisfying the transmission system condition, flow proceeds to step SC4.

In step SC4 it is determined whether an engine negative pressure condition, being that the engine negative pressure PB, indicating the engine load, is within a prescribed value which when low can be used to determine that the engine load is low, is satisfied or not, by a detection signal from the air intake passage pressure sensor 40.

Then, in the case where it is determined in step SC4 that the engine negative pressure condition is not satisfied, in step SC2 the timer T3 is reset, and the present control is terminated.

Conversely, in the case where it is determined in step SC4 that the engine negative pressure condition is satisfied, then in step SC5 it is determined whether a vehicle speed condition, being that the vehicle speed V is less than a predetermined value that determines that the vehicle is stopped, is satisfied or not, by a detection signal from the vehicle speed sensor 36.

Then, in the case where it is determined in step SC5 that the vehicle condition is not satisfied, in step SC2 the timer T3 is reset, and the present control is terminated.

Conversely, in the case where it is determined in step SC5 that the vehicle speed condition is satisfied, then in step SC6 it is determined whether a water temperature condition, being that the engine water temperature TW is greater than a predetermined value that determines that the engine 11 is warm enough, is satisfied or not, by a detection signal from the water temperature sensor 41.

Then, in the case where it is determined in step SC6 that the water temperature condition is not satisfied, in step SC2 the timer T2 is reset, and the present control is terminated.

Conversely, in the case where it is determined in step SC6 that the water temperature condition is satisfied, then in step SC7 it is determined whether a stored charge condition is satisfied or not, being that the stored charge SOC of the battery 17, which is monitored based on an output from the current sensor 24, is below a predetermined second threshold (lower value than the first threshold, for example 25%) that determines whether it subsequently has an influence on assistance control of the engine 11 by the electric motor 12.

Then, in the case where the stored charge SOC is not below the second threshold in step SC7, the timer T2 is reset in step SC2, and the present control is terminated.

Conversely, in the case where the stored charge SOC is below the second threshold in step SC7, it is determined in step SC8 whether the time of the timer T3, from when the stored charge SOC of the battery 17 dropped below the second threshold, is greater or not than a predetermined value for determining whether this drop is temporary.

Then, in the case where the time of the timer T3 is not greater than the predetermined value in step SC8, the present control is terminated.

Conversely, in the case where the time of the timer T3 is greater than the predetermined value in step SC8, then in step SC9 it is determined by a detection signal from the shift position sensor 42 of the transmission 13 whether it is in a situation where creeping torque occurs or not, in other words, whether or not the gear shift is in D position rather than P position or N position.

Then, in the case where the gear shift is not in D position in step SC9, the present control is terminated.

Conversely, in the case where the gear shift is in D position in step SC9, then in step SC10 the clutch 30 of the transmission 13 is disengaged, the engine 11 is disconnected from the drive transmission system, creeping torque is set to 0, and the mechanical load on the engine 11 is reduced.

In the following step SC11, the injectors 32 and the air valve 34 are controlled to increase the idling speed Ne of the engine 11 to a predetermined fourth idling speed (greater than the abovementioned third idling speed (specifically 1100 rpm)) that determines that sufficient generation torque can be obtained.

In the following step SC12, when the electric motor 12 generates electricity from the drive of the engine 11, the generation torque limit is set to a predetermined second upper limit wherein an allowance for generation of the creeping torque is added to the abovementioned first upper limit (for example 1.8 kgfm), and in step SC13 the charging of the electric motor 12 is controlled by the power drive unit 16, such that the electric motor 12 generates electricity from the drive of the engine 11 within a range where the generation torque does not exceed this second upper limit.

According to the above described embodiments, in a control apparatus for a hybrid vehicle that has: an engine 11 which outputs a propulsion force for a vehicle; an electric motor 12 which assists the output from the engine; and a battery 17 for storing electric power generated by the electric motor, and further monitors the stored charge of the battery 17 by a current sensor 24 and an ECU 15, when the engine 11 is idling (step SA1), when the stored charge SOC of the battery 17 detected by the current sensor 24 and the ECU 15 is greater than a predetermined first threshold (step SA8), vibration damping control for suppressing vibration of the engine 11 is performed by the electric motor 12 (step SA14). Alternatively when the stored charge of the battery 17 is less than or equal to the first threshold (step SA8), vibration damping control by the electric motor 12 (step SA10) is inhibited. Furthermore, when the stored charge SOC of the battery 17 detected by the current sensor 24 and the ECU 15 is below a predetermined second threshold that is lower than the first threshold (steps SB7 and SC7), the idling speed Ne of the engine 11 is increased (steps SB10 and SC11).

In this manner, if the stored charge SOC of the battery 17 detected by the current sensor 24 and the ECU 15 becomes less than or equal to the predetermined first threshold, vibration damping control by the electric motor 12 is inhibited, and thus first of all power consumption is suppressed. However, the stored charge of the battery 17 still decreases, and when the stored charge of the battery 17 detected by the current sensor 24 and the ECU 15 is less than the predetermined second threshold that is lower than the first threshold, the idling speed Ne of the engine 11 is increased, and the drive torque of the engine 11 is increased. As a result, it is possible to increase the torque that can be distributed as generation torque for the electric motor to generate electricity, enabling an increase in the amount of charge to the battery.

Accordingly, it is possible to prevent the stored charge SOC of the electric motor battery 12 from being reduced below the minimum required at the time of idling, and additionally the stored charge SOC can be increased.

Furthermore, when the stored charge SOC of the battery 17 detected by the current sensor 24 and the ECU 15 is below the second threshold (steps SB7 and SC7), since the drive torque of the compressor 27 of the air conditioner and creeping torque, being mechanical loads other than the drive torque of the electric motor 12 driven by the engine 11, are removed from the drive torque of the engine 11 (steps SB9 and SC10), it is possible to further increase the torque that can be distributed as generation torque for the electric motor 12 to generate electricity.

Accordingly, it is possible to reliably prevent the stored charge SOC of the battery 17 for the electric motor 12 from being reduced below the minimum required, and additionally, it is possible to increase the stored charge SOC.

Here, the arrangement may be such that the threshold of when mechanical loads other than the drive torque of the electric motor 12 are removed from the drive torque of the engine 11 is set to a third threshold (for example 5%) that is lower than the abovementioned second threshold, and if the stored charge SOC of the battery 17 detected by the current sensor 24 and the ECU 15 is below this third threshold, the mechanical loads, other than the drive torque of the electric motor 12 driven by the engine, are removed from the drive torque.

Furthermore, since the mechanical loads that are removed from the drive torque of the engine 11 as described above are the drive torque of the air conditioner compressor 27 and creeping torque, the torques required for these drives are large, and hence it is possible to effectively increase the torque that can be distributed as generation torque for the electric motor 12 to generate electricity from. In this case, the arrangement may be such that at least one of the drive torque of the air conditioner compressor 27 and the creeping torque is removed from the drive torque of the engine 11.

INDUSTRIAL APPLICABILITY

As described above in detail, in the control apparatus of a hybrid vehicle according to the first aspect of the invention, only in the case where the stored charge of an electric motor battery is greater than a predetermined stored charge threshold, that is, only in the case where there is some surplus stored charge in the electric motor battery, is vibration damping control performed by a vibration damping device. Therefore it is possible to prevent in advance a situation in which there is no surplus stored charge of the electric motor battery, leading to the stored charge of the electric motor battery being reduced significantly by the operation of the vibration damping control device, and thus it is possible to prevent the stored charge of the electric motor battery falling too low.

In the control apparatus for a hybrid vehicle according to the second aspect of the invention, it is possible to perform vibration damping control in a state where there is some surplus stored charge in the electric motor battery, the vehicle is idling, and the engine rotation is stable in regard to the engine speed and engine load, but excepting a case where a high load is required on the engine, that is, only when vibration damping control is genuinely required. Therefore, it is possible to prevent in advance a situation where power is drawn from the electric motor battery wastefully by performing vibration damping control when there is little requirement.

In the control apparatus for a hybrid vehicle according to the third aspect of the invention, in the case where the electrical load of the vehicle in its existing state is high, and vibration damping control is being performed, then in the case where the electric power produced by the engine is insufficient and the deficiency must be drawn from the electric motor battery, by performing vibration damping control only for a predetermined limited time, it is possible to prevent in advance a situation in which the stored charge of the electric motor battery is reduced due to performing vibration damping control over a long time.

In the control apparatus for a hybrid vehicle according to the fourth aspect of the invention, by increasing the engine speed, the amount of electric power produced by the engine increases, and the amount of electric power drawn from the electric motor battery decreases. As a result, it is possible to minimize the decrease of the stored charge of the electric motor battery, and additionally, the increase in the engine speed can reduce the vibration that occupants experience.

In the control apparatus for a hybrid vehicle according to the fifth aspect of the invention, in the case where vibration damping control is discontinued after a predetermined time has passed, since the engine speed is increased in stages, and vibration damping control is discontinued in a state of lower sensation of vibration, occupants experience little unpleasant sensation caused by engine vibration.

In the control apparatus for a hybrid vehicle according to the sixth aspect of the invention, when the stored charge of the battery detected by the storage state monitoring device is less than or equal to the predetermined stored charge threshold, vibration damping control by the electric motor is stopped, and thus first of all power consumption is suppressed. However, the stored charge of the battery still decreases, and when the stored charge of the battery detected by the storage state monitoring device is less than the predetermined second threshold that is lower than the stored charge threshold, the idling speed of the engine is increased, and the drive torque of the engine is increased. As a result, it is possible to increase the torque that can be distributed as generation torque for the electric motor to generate electricity, enabling an increase in the amount of charge to the battery.

In the control apparatus for a hybrid vehicle according to the seventh aspect of the invention, when the stored charge of the battery detected by the storage state monitoring device is the same as the second threshold or less than a third threshold that is even lower, if the arrangement is such that mechanical loads, other than the drive torque of the electric motor driven by the engine, are removed from the drive torque, it is possible to further increase the torque that can be distributed as generation torque for the electric motor to generate electricity.

Accordingly, it is possible to reliably prevent the stored charge of the electric motor battery from being reduced below the minimum required, and additionally, it is possible to increase the stored charge.

In the control apparatus for a hybrid vehicle according to the eighth aspect of the invention, if a mechanical load is either drive torque of an air conditioner compressor or creeping torque, since the torques required for these drives are large it is possible to effectively increase the torque that can be distributed as generation torque for the electric motor to generate electricity.

What is claimed is:

1. A control apparatus for a hybrid vehicle including: an engine which outputs a propulsion force for a vehicle; an electric motor for assisting the output from said engine; a battery for an electric motor that drives said electric motor and also stores electric power generated by said electric motor; and a storage state monitoring device which monitors a stored charge of said electric motor battery, wherein one condition for permitting operation of vibration damping control by said electric motor, for suppressing vibration caused by torque variation of said engine, is that a stored charge of said electric motor battery detected by said battery storage state monitoring device must be greater than a predetermined stored charge threshold, and when said condition is satisfied, vibration damping is performed, or alternatively when said condition is not satisfied, vibration damping is inhibited.

2. A control apparatus for a hybrid vehicle according to claim 1, wherein conditions for permitting vibration damping control require that an electrical load of the vehicle excluding said electric motor is greater than a predetermined electrical load threshold, and when the electrical load exceeds the predetermined electrical load threshold, vibration damping control is performed for a predetermined limited time, and conversely, when said electrical load is less than or equal to the predetermined electrical load threshold, vibration damping control is performed without any set time limit.

3. A control apparatus for a hybrid vehicle according to claim 2, wherein when said electrical load exceeds a predetermined electrical load threshold, and vibration damping control is performed for a predetermined limited time, engine speed is increased as an elapsed time of vibration damping control increases.

4. A control apparatus for a hybrid vehicle according to claim 3, wherein when increasing said engine speed, this is increased in stages as the elapsed time of vibration damping control increases.

5. A control apparatus for a hybrid vehicle according to claim 1, wherein when said engine is idling, when a stored charge of said battery detected by said storage state monitoring device is less than a predetermined second threshold that is lower than said stored charge threshold, an idling speed of said engine is increased.

6. A control apparatus for a hybrid vehicle according to claim 5, wherein when a stored charge of said battery detected by said storage state monitoring device is the same as said second threshold or less than a third threshold that is even lower, mechanical loads, other than a drive torque of said electric motor driven by said engine, are removed from a drive torque of said engine.

7. A control apparatus for a hybrid vehicle according to claim 6, wherein said mechanical load is at least one of drive torque of an air conditioner compressor or creeping torque.

8. A control apparatus for a hybrid vehicle, wherein conditions for permitting operation of vibration damping control require that, in addition to a stored charge of said electric motor battery detected by said storage state monitoring device being greater than a predetermined stored charge threshold, the vehicle is idling, engine speed is within a prescribed range, and engine load is within a prescribed range, and vibration damping control is performed when all conditions are satisfied.

9. A control apparatus for a hybrid vehicle according to claim 8, wherein conditions for permitting vibration damping control require that an electrical load of the vehicle excluding said electric motor is greater than a predetermined electrical load threshold, and when the electrical load exceeds the predetermined electrical load threshold, vibration damping control is performed for a predetermined limited time and conversely, when said electrical load is less than or equal to the predetermined electrical load threshold, vibration damping control is performed without any set time limit.

10. A control apparatus for a hybrid vehicle according to claim 9, wherein when said electrical load exceeds a predetermined electrical load threshold, and vibration damping control is performed for a predetermined limited time, engine speed is increased as an elapsed time of vibration damping control increases.

11. A control apparatus for a hybrid vehicle according to claim 10, wherein when increasing said engine speed, this is increased in stages as the elapsed time of vibration damping control increases.

* * * * *